(12) United States Patent
Fujinaka et al.

(10) Patent No.: US 11,092,087 B2
(45) Date of Patent: Aug. 17, 2021

(54) THROTTLE VALVE DEVICE

(71) Applicants: DENSO DAISHIN CORPORATION, Tokoname (JP); DENSO CORPORATION, Kariya (JP)

(72) Inventors: Yuta Fujinaka, Tokoname (JP); Kenichi Ishihara, Tokoname (JP); Tohru Shimizu, Tokoname (JP)

(73) Assignees: DENSO DAISHIN CORPORATION, Tokoname (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 16/992,184

(22) Filed: Aug. 13, 2020

(65) Prior Publication Data

US 2021/0062734 A1 Mar. 4, 2021

(30) Foreign Application Priority Data

Aug. 27, 2019 (JP) .............................. JP2019-155003

(51) Int. Cl.
*F02D 9/10* (2006.01)
*F02D 11/10* (2006.01)

(52) U.S. Cl.
CPC ........... *F02D 9/1065* (2013.01); *F02D 9/107* (2013.01); *F02D 9/1035* (2013.01); *F02D 11/10* (2013.01)

(58) Field of Classification Search
CPC ...... F02D 9/1065; F02D 9/1035; F02D 9/107; F02D 11/10
USPC ........................................................ 123/399
See application file for complete search history.

(56) References Cited

U.S. PATENT DOCUMENTS

| 6,095,488 A * | 8/2000 | Semeyn, Jr. .......... | F02D 11/107 185/40 R |
| 6,725,833 B1 * | 4/2004 | Irihune ................... | F02D 9/10 123/399 |
| 2004/0084016 A1 * | 5/2004 | Torii ....................... | F02D 11/10 123/399 |
| 2004/0129253 A1 * | 7/2004 | Ozeki ..................... | F02D 11/10 123/399 |

(Continued)

FOREIGN PATENT DOCUMENTS

JP 2013-104391 A 5/2013

OTHER PUBLICATIONS

U.S. Appl. No. 16/992,173, filed Aug. 13, 2020, Makoto Uno et al.
(Continued)

*Primary Examiner* — Mahmoud Gimie
(74) *Attorney, Agent, or Firm* — Harness, Dickey & Pierce, P.L.C.

(57) ABSTRACT

A throttle valve device includes a body, a valve, a valve gear, a motor, an intermediate gear, an intermediate shaft and a cover. A guiding hole is formed in the cover and the intermediate shaft engages the guiding hole. A positioning reference pin is formed in one of the cover and the body at a position around the motor. A positioning reference hole is formed in the other of the cover and the body at a position around the motor. The body and the cover are positioned with respect to each other by both engaging between the intermediate shaft and the guiding hole and engaging between the positioning reference pin and the positioning reference hole. The body and the cover are fixed to each other by a fixing member.

7 Claims, 37 Drawing Sheets

(56) References Cited

U.S. PATENT DOCUMENTS

2008/0087858 A1* 4/2008 Hatsuzawa ............. F02D 9/105
251/129.11

OTHER PUBLICATIONS

U.S. Appl. No. 16/992,182, filed Aug. 13, 2020, Koshiro Miwa et al.

* cited by examiner

RANGE IN CIRCUMFERENTIAL DIRECTION OF MAGNET

HORIZONTAL AXIS OF MOTOR

THROTTLE VALVE DEVICE

CROSS REFERENCE TO RELATED APPLICATIONS

This application is a non-provisional application, which claims the benefit of priority from Japanese Patent Application No. 2019-155003 filed on Aug. 27, 2019. The entire disclosure of all of the above application is incorporated herein by reference.

TECHNICAL FIELD

The present disclosure in this specification relates to a throttle valve device, and the throttle valve device may be used as, for example, an electronic throttle device for controlling intake air of an engine, an EGR valve used in an exhaust gas circulation system, an intake passage pressure control valve for a diesel engine, and a negative pressure control valve for controlling a hydrogen concentration of a fuel cell. The present disclosure particularly relates to an assembling structure of a body and a cover.

BACKGROUND

For example, in a conventional electronic throttle device, when a cover is attached to a body, a positioning pin formed on an end surface around a rotation angle sensor is used. This is to prevent a detection accuracy of the rotation angle sensor from being lowered due to the displacement of the cover with respect to the body.

SUMMARY

In one aspect of the present disclosure, a throttle valve device includes a body, a valve, a valve gear, a motor, an intermediate gear, an intermediate shaft, and a cover. The body defines a passage on one side and a motor space on the other side therein. The valve is disposed in the passage and is configured to rotate together with a shaft to control a flow rate by adjusting a passage area of the passage. The valve gear rotates the shaft. The motor is disposed in the motor space and generates a driving force for the valve gear to rotate. The intermediate gear is disposed between the motor and the valve gear. The intermediate gear is configured to transmit the driving force of the motor to the valve. The intermediate shaft rotatably supports the intermediate gear. The cover covers an open end of the body to house the valve gear, the intermediate gear, and the motor in the body.

A guiding hole is formed in the cover and the intermediate shaft engages the guiding hole. A positioning reference pin is formed in one of the cover and the body at a position around the motor. A positioning reference hole is formed in the other of the cover and the body at a position around the motor. The body and the cover are positioned with respect to each other by both engaging between the intermediate shaft and the guiding hole and engaging between the positioning reference pin and the positioning reference hole. The body and the cover are fixed to each other by a fixing member.

BRIEF DESCRIPTION OF THE DRAWINGS

The disclosure, together with additional objectives, features and advantages thereof, will be best understood from the following description, the appended claims and the accompanying drawings.

DETAILED DESCRIPTION

Figure 1:
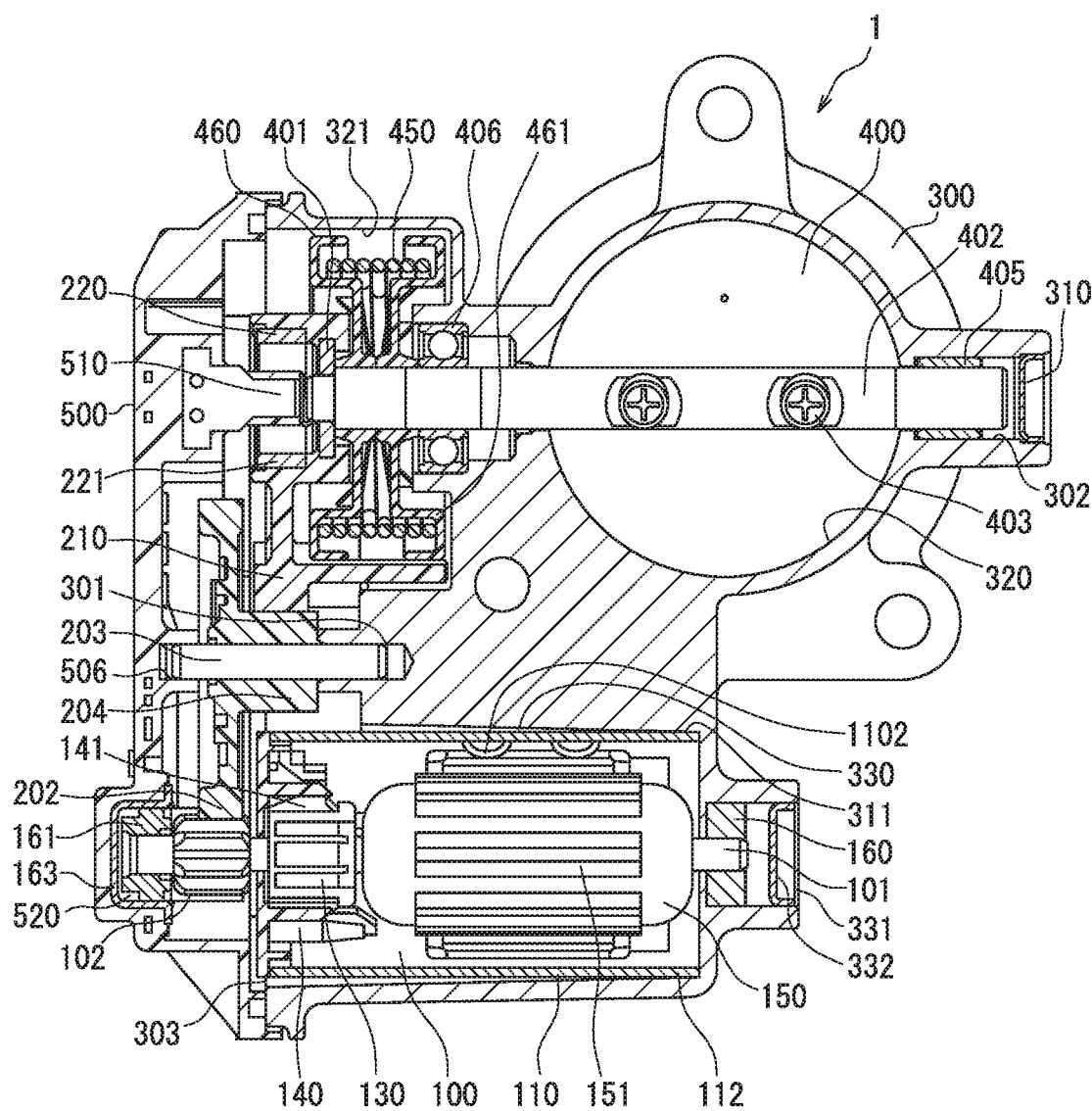
FIG. 1 is a vertical cross-sectional view of an electronic throttle.

To begin with, a relevant technology will be described only for understanding the following embodiments. In a throttle valve device, a passage is typically formed in an upper portion of the body, and a motor is disposed in a lower portion of the body. Since the rotation angle sensor is used to detect rotation angles of a valve that opens and closes the passage, the rotation angle sensor is disposed in the upper portion.

Therefore, if the cover is positioned with respect to the body at the upper part around the rotation angle sensor, the positioning accuracy of the rotation angle sensor is certainly improved. On the contrary, however, the positioning accuracy of the motor located in the lower portion is lowered.

The present disclosure has been made in view of the above, and one objective thereof is to improve the positioning accuracy between the body and the cover at a lower portion of the body where the motor is disposed.

As described above, in a first aspect of the present disclosure, a throttle valve device includes a body, a valve, a valve gear, a motor, an intermediate gear, an intermediate shaft, and a cover. The body defines a passage on one side and a motor space on the other side therein. The valve is disposed in the passage and is configured to rotate together with a shaft to control a flow rate by adjusting a passage area of the passage. The valve gear rotates the shaft. The motor is disposed in the motor space and generates a driving force for the valve gear to rotate. The intermediate gear is disposed between the motor and the valve gear. The intermediate gear is configured to transmit the driving force of the motor to the valve. The intermediate shaft rotatably supports the intermediate gear. The cover covers an open end of the body to house the valve gear, the intermediate gear, and the motor in the body.

A guiding hole is formed in the cover and the intermediate shaft engages the guiding hole. A positioning reference pin is formed in one of the cover and the body at a position around the motor. A positioning reference hole is formed in the other of the cover and the body at a position around the motor. The body and the cover are positioned with respect to each other by both engaging between the intermediate shaft and the guiding hole and engaging between the positioning reference pin and the positioning reference hole. The body and the cover are fixed to each other by a fixing member.

Accordingly, the detection accuracy around the motor can be improved. For example, if each component, such as a motor yoke, of the motor is individually attached to the body of an electronic throttle device before those components are assembled into the motor, it is more important to improve the positioning accuracy around the motor. In view of this, the throttle valve device according to the first aspect can improve the detection accuracy around the motor.

In a second aspect of the present disclosure, a clearance between the intermediate shaft and the guiding hole is smaller than a clearance between the positioning reference pin and the positioning reference hole. According to the second aspect, temporary assembly is performed by both engaging between the intermediate shaft and the guiding hole and engaging between the positioning reference pin and the positioning reference hole, and then the body and the cover are fixed together as final assembly. Thus, although a minute deviation inevitably occurs between the temporary assembly and the final assembly, this minute deviation occurs around the intermediate shaft. Since the intermediate shaft is located at the center of the body, the negative influence on the rotation angle sensor and the motor by the minute deviation can be minimized.

In a third aspect of the present disclosure, a first gap between the positioning reference pin and the positioning reference hole in a direction along a line that connects the positioning reference pin and the intermediate shaft is larger than a second gap between the positioning reference pin and the positioning reference hole in a direction perpendicular to the line that connects the positioning reference pin and the intermediate shaft. Since an electronic throttle device has a vertically elongated shape in which a throttle valve is disposed in an upper portion and the motor is disposed in a lower portion, the electronic throttle device is elongated in a direction along the line that connects the positioning reference pin and the intermediate shaft. Therefore, the difference in thermal expansion due to the difference in thermal expansion coefficient between an aluminum body and a resin cover can be effectively absorbed.

In a fourth aspect of the present disclosure, the positioning reference pin has a first length in a direction along a line that connects the positioning reference pin and the intermediate shaft. The positioning reference pin has a second length in a direction perpendicular to the line that connects the positioning reference pin and the intermediate shaft. The first length is shorter than the second length. The positioning reference hole has a circular shape. The same advantage according to the third aspect can be obtained.

In a fifth aspect of the present disclosure, a clearance between the intermediate shaft and the guiding hole is larger than a clearance between the positioning reference pin and the positioning reference hole. Since, a minor positional deviation occurs during bolt-fastening subsequent to the temporary assembly around the positioning reference hole and the positioning reference pin that are close to the motor, the positioning accuracy at the motor is improved. Accordingly, the positional accuracy between a motor terminal and a cover terminal fitted into the motor terminal is also improved.

In a sixth aspect of the present disclosure, the gap between the intermediate shaft and the guiding hole according to the fifth aspect is formed by the cover, and in a seventh aspect of the present disclosure, a gap is formed between the intermediate shaft and the body.

Hereinafter, an embodiment in which the present disclosure is applied to an electronic throttle device will be described below with reference to the drawings. As described above, the present disclosure can be widely used as a throttle valve device such as an EGR valve, a diesel engine intake passage pressure control valve, and a fuel cell negative pressure control valve. Therefore, the names of the throttle shaft, the throttle valve, and the like are used because the present disclosure is applied to the electronic throttle device, but such uses of the shaft and the valve are not necessarily limited to the throttle.

FIG. 1 is a vertical cross-sectional view of the electronic throttle device. An outline of the electronic throttle device 1 will be described with reference to FIG. 1. The electronic throttle device 1 is arranged in an engine compartment and controls a flow rate of an intake air taken into an engine. An engine control unit (not shown) calculates an optimum intake amount in accordance with driver's accelerator pedal operations, an engine rotation state, and the like, and outputs a rotational amount according to the calculation results to the motor 100.

Figure 2:
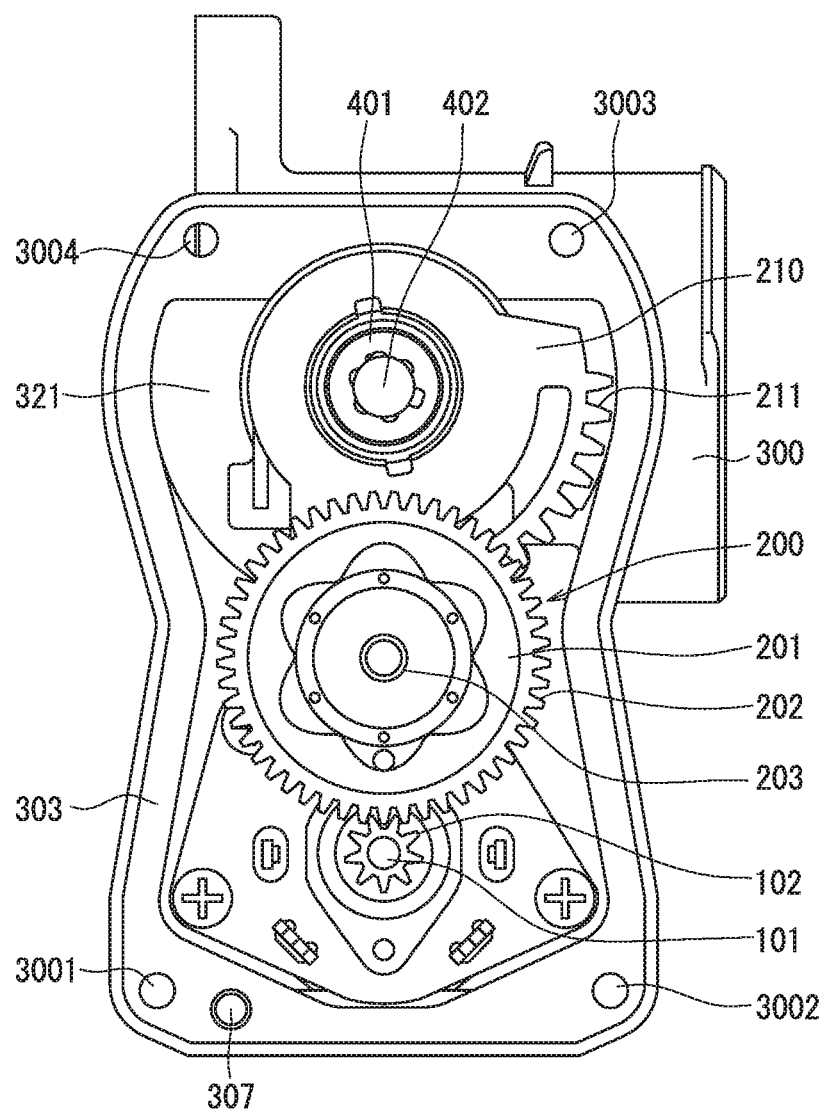
FIG. 2 is a front view of a body.

The motor 100 is disposed in a motor space 330 of a body 300, and the rotation of the motor 100 is transmitted to a reduction mechanism 200 via a motor pinion 102 that is press-fitted and fixed to a motor shaft 101. As shown in FIG. 2, in the reduction mechanism 200, large-diameter teeth 202 on an intermediate gear 201 meshes with the motor pinion 102. The intermediate gear 201 is held to be rotatable about an intermediate shaft 203. The intermediate shaft 203 is press-fitted and fixed into a fitting hole 301 of the body 300.

Small-diameter teeth 204 on the intermediate gear 201 meshes with teeth 211 formed in an arc shape on an outer circumferential surface of the valve gear 210, and the rotation of the motor pinion 102 is transmitted to the valve gear 210 via the intermediate gear 201. Therefore, the reduction mechanism 200 includes the motor pinion 102, the large-diameter teeth 202 and the small-diameter teeth 204 of the intermediate gear 201, and the teeth 211 of the valve gear 210. The reduction rate is set such that when the motor shaft 101 rotates 28 times, the one tooth 211 of the valve gear 210 advances clockwise or counterclockwise.

Semicircular arc-shaped magnets 220 and 221 are arranged in an inner circumference of a cup-shaped center portion 212 of the valve gear 210, and the magnets 220 and 221 form a magnetic circuit. A disk-shaped lever 401 is disposed in a deep portion (the right side in FIG. 1) of the cup-shaped center portion 212 of the valve gear 210. The magnets 220 and 221 and the lever 401 are insert-molded with the valve gear 210.

The lever 401 is fixed to an end of the throttle shaft 402 by swaging. Therefore, the valve gear 210 is connected to the throttle shaft 402 via the lever 401, and the rotation of the valve gear 210 is transmitted to the throttle shaft 402. A disc-shaped throttle valve 400 is fixed to the throttle shaft 402 by screws 403, and the throttle valve 400 increases or decreases the opening area of an intake passage 320 formed in the body 300 in accordance with the rotational position thereof.

Figure 3:
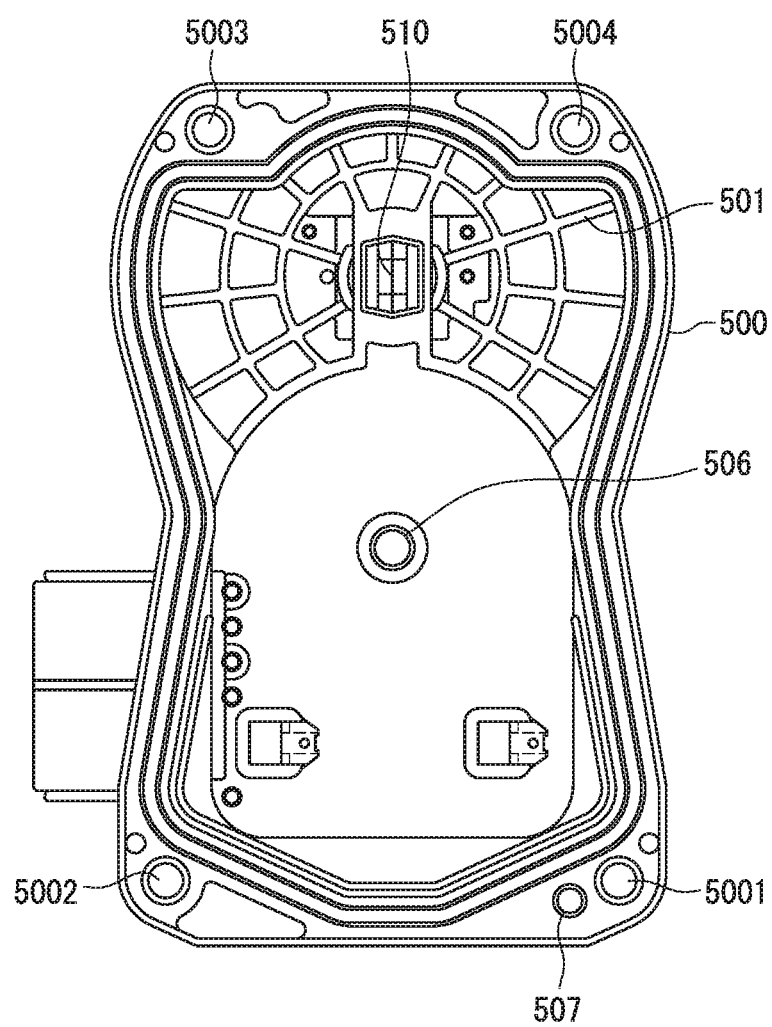
FIG. 3 is a front view of a cover.

An open end 303 (the left side in FIG. 1) of the body 300 is covered with a cover 500. The cover 500 is formed of a resin such as polybutyl terephthalate, and as shown in FIG. 3, ribs are formed at specified locations to increase its strength. A pair of rotation angle sensors 510, which are Hall ICs, are disposed in the cover 500 at positions corresponding to the axis of the throttle shaft 402. The rotation angle sensor 510 is fixed to the cover 500. However, the pair of arc-shaped magnets 220 and 221, which are insert-molded with the valve gear 210, are disposed on an outer circumference of the rotation angle sensor 510. Then, the magnets 220, 221 rotate about the shaft axis of the throttle shaft in accordance with the rotation of the throttle shaft 402. Accordingly, the magnetic circuit is moved to a position corresponding to the rotation angle of the throttle valve 400. The rotation angle sensor 510 detects the change in the magnetic force caused by the change in the magnetic circuit, and thus detects the opening degree of the throttle valve 400. Then, the detected position information is fed back to an engine control unit (not shown).

The throttle shaft 402 is rotatably supported in the body 300 by bearings 405 and 406 disposed on both sides of the throttle valve 400. The bearing 405 is a plain bearing, and the bearing 406 is a ball bearing. An opening 302 of the body 300 for the throttle shaft 402 is an opening for the bearing 405 to be inserted and is covered by the plug 310.

A space 321 for housing the valve gear 210 is formed in the body 300, and a coil ring 450 for urging the throttle shaft 402 is disposed in this space 321. The coil spring 450 has a cylindrical shape, and both ends thereof are bent and protrude radially outward. The both ends of the coil spring 450 are locked to a locking surface of the body 300 and a locking surface of the valve gear 210 with a predetermined preload. It should be noted that 460 and 461 indicate guides disposed on both sides of the coil spring 450, and the guides 460, 461 guide the torsional movement of the coil spring 450.

When the force of the motor 100 is not transmitted to the valve gear 210, the biasing force of the coil spring 450 holds the throttle valve 400 at an intermediate position to close the intake passage 320. However, at this intermediate position, the intake passage 320 is not fully closed so that a predetermined amount of intake air can flow into the intake passage 320 and the vehicle can travel to evacuate when a failure occurs.

When the throttle valve 400 is rotated to the fully open position from the intermediate open position, one spring end of the coil spring 450 is locked to generate a biasing force in a returning direction, and the motor 100 rotates the throttle shaft 402 against the biasing force toward the returning side.

On the contrary, when the throttle valve 400 is rotated from the intermediate open position to the fully closed position, the other spring end of the coil spring 450 is locked and an urging force in an opening direction is generated. Then, the motor 100 rotates the throttle shaft 402 against the biasing force in the opening direction.

Next, the structure of the motor 100 constituting the electronic throttle device 1 will be described in detail.

Figure 4:
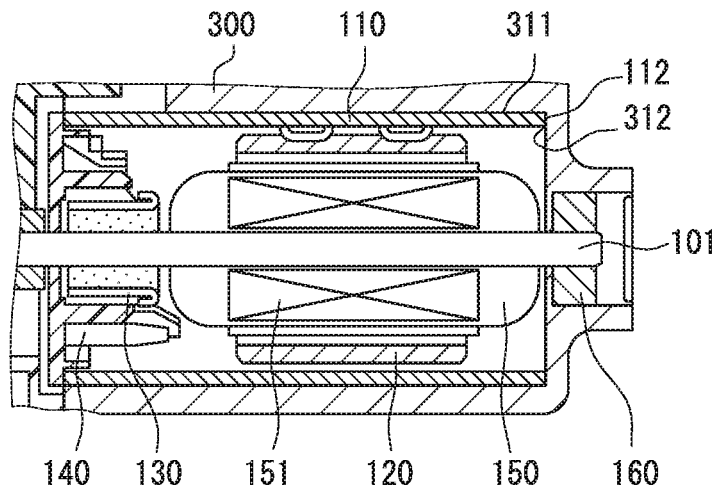
FIG. 4 is a vertical cross-sectional view of a motor part.

As shown in FIG. 4, the motor yoke 110 has a cylindrical shape with both ends being open. The motor yoke 110 is formed by bending a cold-rolled steel having a thickness of about 1 to 2 mm. Since a conventional motor yoke was formed into a cup shape by deep-drawing, 10 or more molding dies had been required. Therefore, the number of molding processes was increased, which resulted in an increase in a manufacturing cost. On the contrary, since the motor yoke 110 of this example is formed by bending a flat plate material, the molding process is facilitated, the manufacturing cost can be reduced, and the material cost can be decreased.

Figure 5:
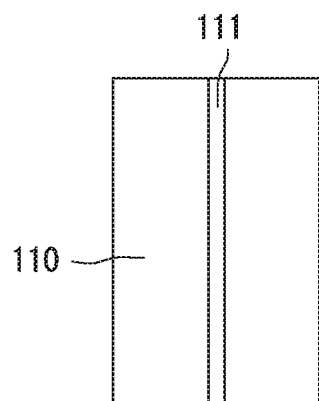
FIG. 5 is a front view of a motor yoke.
Figure 6:
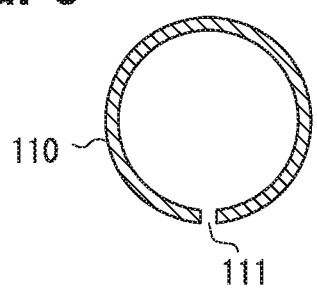
FIG. 6 is a cross-sectional view of the motor yoke.

At the bending process, as shown in FIGS. 5 and 6, a slit 111 having a predetermined length is formed between both ends of the motor yoke 110. Then, as shown in FIGS. 1 and 4, the body 300 is press-fitted into the motor space 330 from the open end 303. The deep side of the motor space 330 has a small-diameter portion 311 for press-fitting, and an end of the small-diameter portion 311 and/or an end surface 112 of the motor yoke 110 is tapered to be smoothly press-fit. The press-fitting presses the motor yoke 110 and closes the slit 111 as shown in FIGS. 7 and 8.

Figure 9:
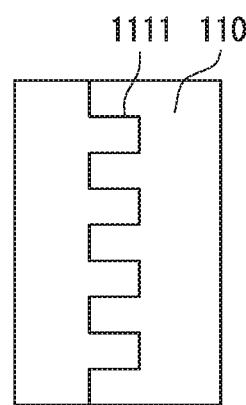
FIG. 9 is a front view of a motor yoke according to a modified example.
Figure 10:
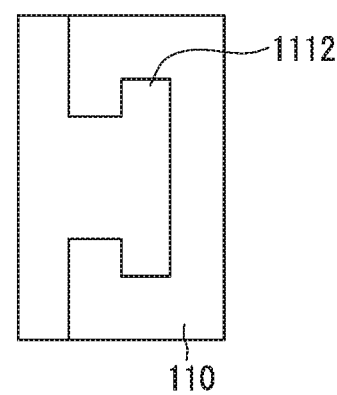
FIG. 10 is a front view of the motor yoke according to a modified example.

Although the slit 111 has a linear shape in the example of FIG. 5, it is needless to say that the slit 111 may have another shape. For example, a zigzag-shaped slit 1111 may be used as shown in FIG. 9, or a nested slit 1112 may be used as shown in FIG. 10. With the zigzag slit 1111 of FIG. 9, the motor yoke 110 can be positioned in the axial direction and the circumferential direction, and the shape of the flat plate material that is bent into a cylindrical shape can be stable. On the other hand, in the nested slit 1112 in FIG. 10, the motor yoke 110 can be regulated in both directions for reducing and expanding the diameter of the motor yoke 110, and thus the cylindrical shape can be stable.

Figure 11:
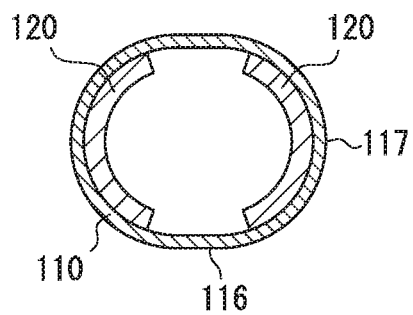
FIG. 11 is a cross-sectional view of the motor yoke according to the modified example.

The cross-sectional shape of the motor yoke 110 is not necessarily limited to the cylindrical shape as shown in FIG. 6, and may be a track shape having flat portions 116 as shown in FIG. 11. With the track shape, the position of the motor yoke 110 in the rotational direction can be regulated, and thus the positions of the magnets 120 disposed in the arc portion 117 can be easily set. Therefore, when magnetizing the motor yoke 110 and the magnets 120 after both are assembled to the body, the relative positions of the magnetizing yoke and the magnets 120 can be properly set.

Figure 7:
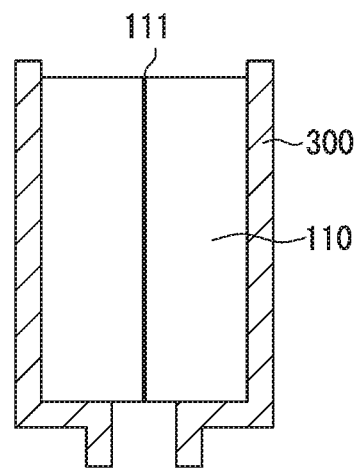
FIG. 7 is a front view of the motor yoke disposed in the body.
Figure 8:
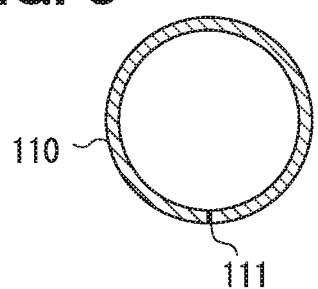
FIG. 8 is a cross-sectional view of the motor yoke disposed in the body.
Figure 12:
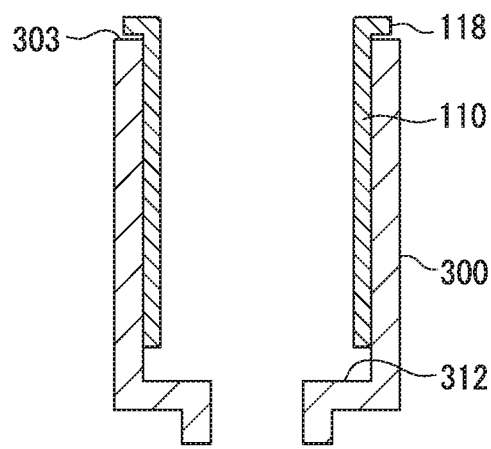
FIG. 12 is a cross-sectional view of the motor yoke according to the modified example.

Further, in the above-described examples of FIGS. 1, 4, and 7, the motor yoke 110 is brought into contact with an innermost surface 312 of the motor space 330 of the body 300 to position the motor yoke 110 in the axial direction. Alternatively, as shown in FIG. 12, a positioning yoke flange 118 may be formed at an end of the yoke 110 on the side of the open end 303, and the yoke flange 118 may be brought into contact with the open end 303 of the body 300 to be positioned in the axial direction. Since electric components such as a commutator 130 and a brush holder 140 are disposed in the body 300 at a position close to the open end 303, the positioning accuracy can be improved by the yoke flange 118.

The yoke flange 118 is formed after bending the flat plate and then welding both end surfaces of the plate to form the motor yoke 110 into a cylindrical shape. The yoke flange 118 may also be formed by molding an end portion of the cylindrical material when the motor yoke 110 is made from the cylindrical material.

Figure 14:
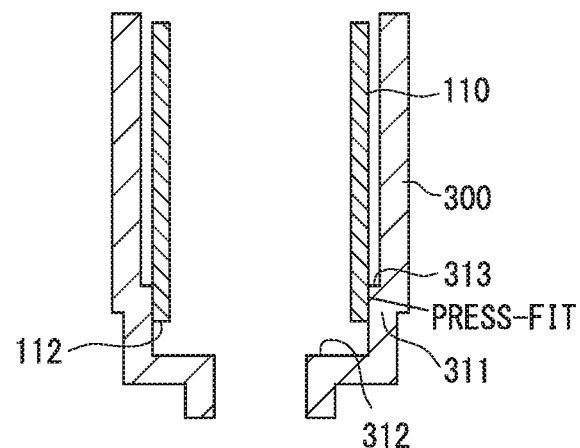
FIG. 14 is a cross-sectional view of the contact surface between the body and the motor yoke.
Figure 13:
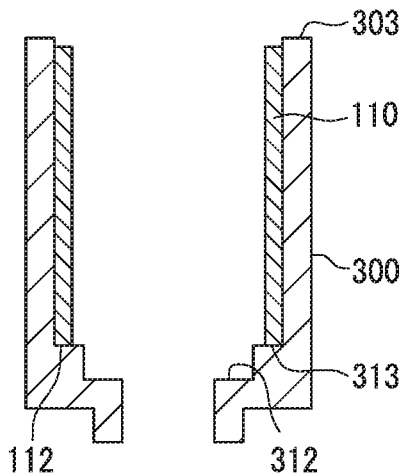
FIG. 13 is a cross-sectional view of a contact surface between the body and the motor yoke.

When it is difficult to obtain high accuracy in the positioning by the innermost surface 312 of the motor space 330 of the body 300, a step 313 for positioning may be formed in the body 300 and the end surface 112 of the motor yoke 110 may be brought into contact with the step 313, as shown in FIG. 13. However, if a certain positioning accuracy can be secured with a jig or the like, the motor yoke 110 is just press-fitted into the small-diameter portion 311 of the body 300, and a gap may be formed between the innermost surface 312 of the body 300 and the end surface 112 of the motor yoke 110. In the example of FIG. 14, only a part of the motor yoke 110 in the axial direction is press-fitted into the body 300. Hence, the press-fitting load can be reduced and deformation of the motor yoke 110 during press-fitting can be avoided.

Figure 15:
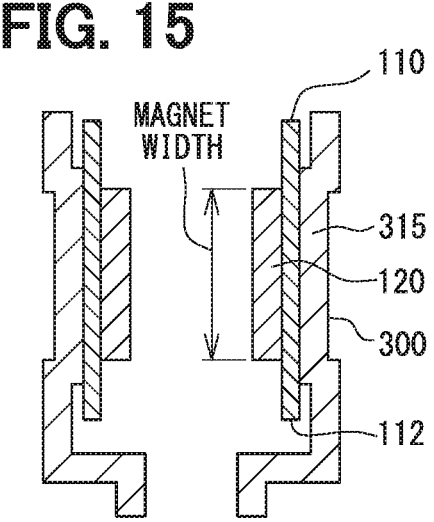
FIG. 15 is a cross-sectional view of the contact surface between the body and the motor yoke according to a modified example.

In the above example, the press-fitting of the motor yoke 110 is performed at the deep side of the motor space 330 of the body 300. However, the motor yoke 110 may be press-fitted at a position where the magnet 120 is disposed as shown in FIG. 15. Rather, the press-fitting at the position where the magnet 120 is disposed can eliminate the gap between the motor yoke 110 and the body 300. When the magnets 120 are assembled to the body 300 and then the magnets 120 are magnetized, since the gap between the body 300, the motor yoke 110, and the magnets 120 is the smallest, an air gap also becomes small, the magnetic flux at the time of magnetization is increased, and the motor performance can be improved. Therefore, the press-fitting at the position of the magnets 120 is preferable. In this case, a reduced diameter portion 315 is formed in a region of the motor space 330 of the body 300 corresponding to the magnets 120, and an end of the reduced diameter portion 315 and/or the end surface 112 of the motor yoke 110 is tapered. As a result, it is possible to realize smooth press-fitting of the motor yoke 110.

Figure 16:
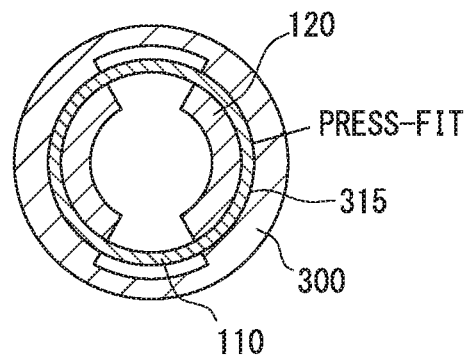
FIG. 16 is a cross-sectional view of the contact surface between the body and the motor yoke according to a modified example.

As shown in FIG. 16, the reduced diameter portion 315 of the body 300 may be formed only in a region of the motor space 330 corresponding to the magnets 120 in the circumferential direction. With this structure, when the magnets 120 are attached to the body 300 and then magnetized, the air gap becomes small, the magnetic flux at the time of magnetization is improved, and the motor performance can be improved because the gap between the body 300, the motor yoke 110, and the magnets 120 is the smallest. In addition, the contact area between the motor yoke 110 and the body 300 in the circumferential direction is reduced, the press-fitting load can be reduced, and the deformation of the motor yoke 110 during press-fitting can be avoided.

Figure 17:
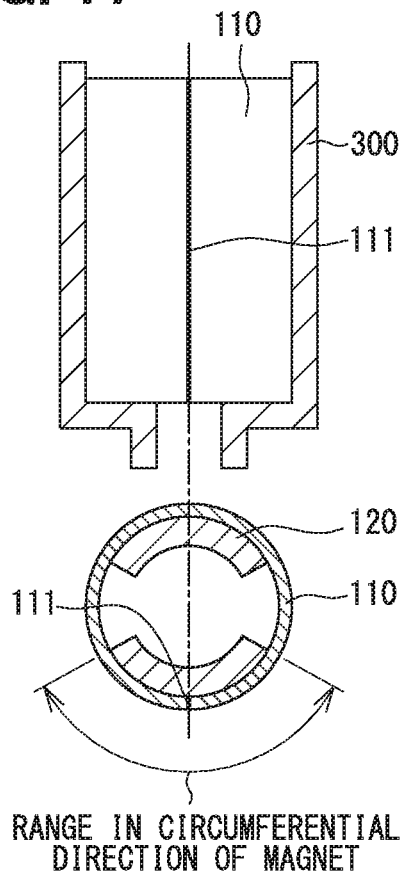
FIG. 17 is a cross-sectional view showing a position of a slit of the motor yoke.

From the viewpoint in forming a magnetic circuit, the above-mentioned slit 111 may interfere with the magnetic circuit and may be not desirable. Therefore, when the slit 111 is necessarily formed, the slit 111 should be located at a position covered by the magnet 120 as shown in FIG. 17. This makes it possible to prevent the magnetic circuit from being blocked by the slit 111.

Figure 18:
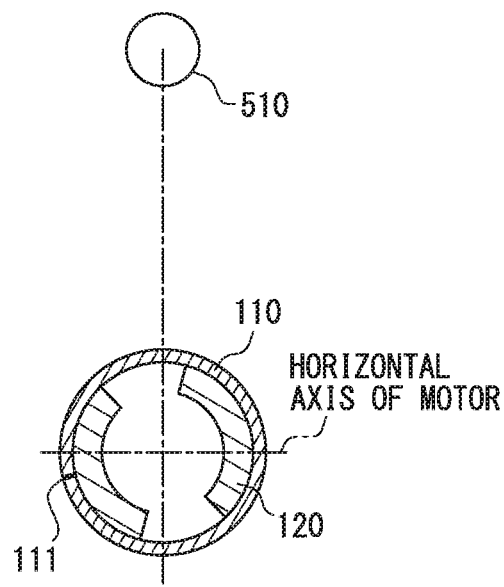
FIG. 18 is a cross-sectional view showing a position of the slit of the motor yoke.

Since the rotation angle sensor 510 described above detects the rotational position of the throttle valve 400 based on the magnetic forces of the magnets 220 and 221, it is not desirable that the magnetic force from the magnet 120 leaks out through the slit 111. Therefore, when the slit 111 is necessarily formed, as shown in FIG. 18, the slit 111 should be disposed on a back surface of the magnet 120 and at a position as far as possible away from the rotation angle sensor 510.

Figure 19:
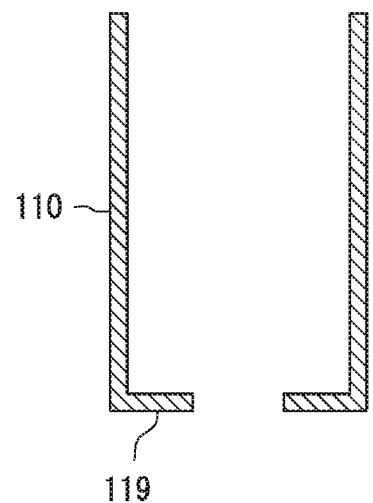
FIG. 19 is a cross-sectional view of the motor yoke according to a modified example.

Further, in the example of FIG. 12, the yoke flange 118 is formed in the motor yoke 110 close to the body open end 303. However, as shown in FIG. 19, a yoke bottom portion 119 may be formed at the body innermost surface 312. By forming the yoke bottom portion 119, the strength of the motor yoke 110 can be increased, the load generated when the motor yoke 110 is press-fitted into the body 300 can be increased, and the holding power by the motor yoke 110 can be increased. In order to form the yoke flange 118 and the bottom portion 119, a bent plate material is welded, or a cylindrical material is used for the motor yoke 110 and the yoke flange 118 and the bottom portion 119 is formed at an end of the cylindrical material. As a result, the slit 111 can be prevented.

Figure 20:
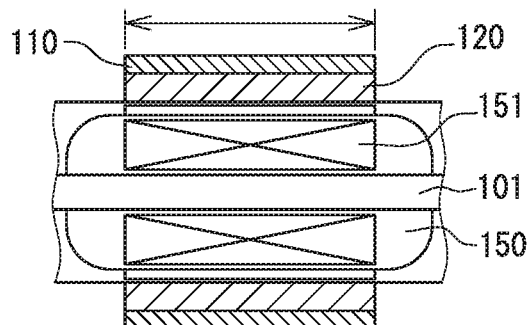
FIG. 20 is a cross-sectional view of the contact surface between the body and the motor yoke.

Further, in the above example, the motor yoke 110 covers the armature core 150 and the brush holder 140. However, the axial length of the motor yoke 110 may be shortened to cover only the armature core 150. Further, as shown in FIG. 20, the motor yoke 110 may have a length to cover only the magnets 120.

Among the functions of the motor yoke 110, the function as a frame member to hold the motor shaft 101 may be performed by the body 300. However, the body 300 is not suitable to form a magnetic circuit since the body 300 is made of a die-cast material of aluminum. Therefore, the motor yoke 110 made of an iron material is required at the portion to cover the magnets 120. The example of FIG. 20 is an example in which the motor yoke 110 is used with a required minimum amount.

Returning to FIGS. 1 and 4, the armature core 150 is press-fitted into the motor shaft 101, and the motor coil 151 is wound around the armature core 150. The motor coil 151 faces the magnets 120 while the armature core 150 is arranged inside the motor yoke 110. The commutator 130 is also press-fitted into the motor shaft 101, and the brush holder 140 is arranged to cover the commutator 130. A carbon brush 141 held by the brush holder 140 is pressed against the commutator 130 by a spring, and power is supplied to the brush 141.

The above-described motor pinion 102 is press-fitted into the motor shaft 101 at a position closer to the open end 303 than the commutator 130. Then, the motor shaft 101 is rotatably supported by the motor bearings 160 and 161 at both ends thereof. One of the motor bearings 160 is a sintered metal impregnated with oil, and the motor bearing 160 is press-fitted into the motor space 330 through a motor opening 331 that is in communication with the motor space 330 of the body 300. Then, the motor opening 331 is sealed by the motor plug 332.

The other of the motor bearings 161 is also a sintered metal impregnated with oil, and is held by a collar 163 disposed in the bearing space 520 of the cover 500. In addition, since the cover 500 is made of polybutyl terephthalate and there is a risk of insufficient strength as described above, the collar 163 is disposed in the cover 500. The collar 163 may be made of metal such as iron, stainless steel or aluminum, or may be made of thermosetting resin such as epoxy resin or phenol resin.

Note that either one or both of the motor bearings 160 and 161 may be a ball bearing instead of using the sintered metal impregnated with oil.

In this example, since both ends of the motor shaft 101 are supported by the motor bearings 160 and 161, the rotation support can be favorably performed. Particularly, in comparison with a conventionally used example in which the motor bearing is arranged between the motor pinion 102 and the commutator 130, the motor pinion 102 of this embodiment is interposed between the motor bearing 161 and the commutator 130. Thus, the motor pinion 102 can prevent foreign matter such as abrasion powder of the brush 141 from reaching the motor bearing 161.

If the motor bearing 161 is made of a sintered metal impregnated with oil, the oil may leak from the motor bearing 161 due to swelling of the oil at a high temperature. However, since the motor pinion 102 is present as in this embodiment, it is possible to effectively prevent the leaked oil from flowing toward the commutator 130.

Figure 21:
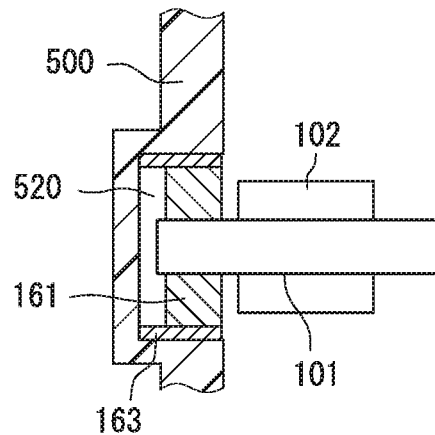
FIG. 21 is a cross-sectional view showing a motor bearing of the cover.
Figure 22:
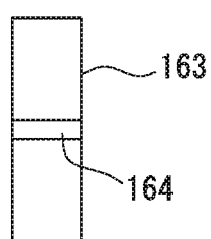
FIG. 22 is a front view showing an example in which a slit is formed in a collar.
Figure 23:
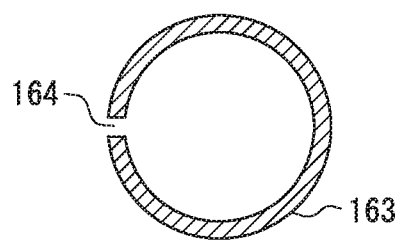
FIG. 23 is a cross-sectional view of the collar of FIG. 22.

The collar 163 may have any shape as long as it fits into the bearing space 520 of the cover 500, and may have a cylindrical shape as shown in FIG. 21. Since the width of the motor bearing 161 is about 5 mm, the collar 163 may have a width equal to or greater than the width of the motor bearing 161. If the collar 163 has a cylindrical shape as shown in FIG. 21, insertion of the collar 163 into the bearing space 520 can be easily done by forming a color slit 164 as shown in FIGS. 22 and 23.

Figure 24:
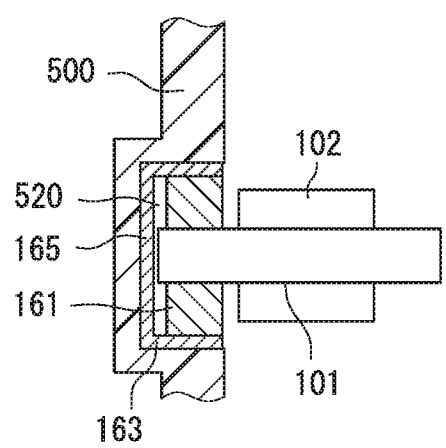
FIG. 24 is a cross-sectional view showing the motor bearing of the cover according to a modified example.

The shape of the collar 163 may be a bottomed cylindrical shape as shown in FIG. 24. With this shape, the strength of the collar 163 can be increased. In addition, the cylindrical shape with a bottom makes it possible to integrally insert-mold the collar 163 together with the cover 500. That is, the bottom portion 165 of the collar 163 can prevent a resin generated during injection molding of the cover 500 from flowing into the bearing space 520.

Figure 25:
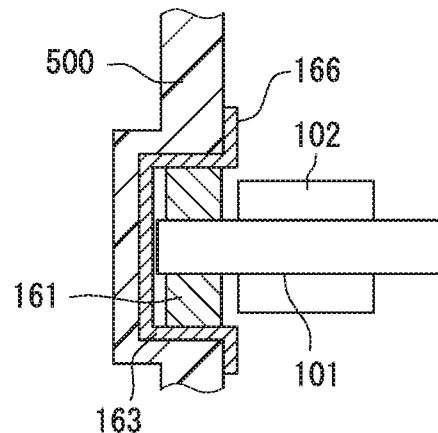
FIG. 25 is a cross-sectional view showing the motor bearing of the cover according to a modified example.

As shown in FIG. 25, the shape of the collar 163 may be a bottomed cylindrical shape with a collar flange 166, i.e., a top hat shape. The collar flange 166 further increases the strength of the collar 163, and insert molding is facilitated.

Figure 26:
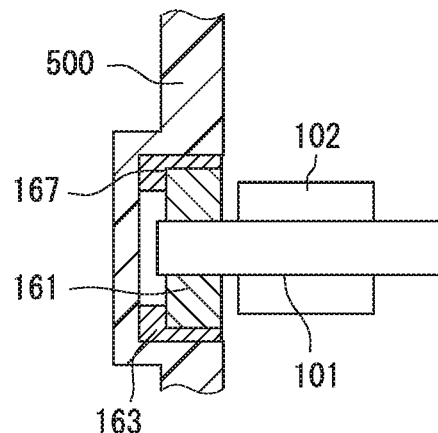
FIG. 26 is a cross-sectional view showing the motor bearing of the cover according to a modified example.

Further, as shown in FIG. 26, a step portion 167 may be formed in the collar 163 and the motor bearing 161 may be positioned by the step portion 167 in the axial direction. By having the motor bearing 161 in contact with the step portion 167, the positional accuracy of the motor bearing 161 is improved.

Figure 27:
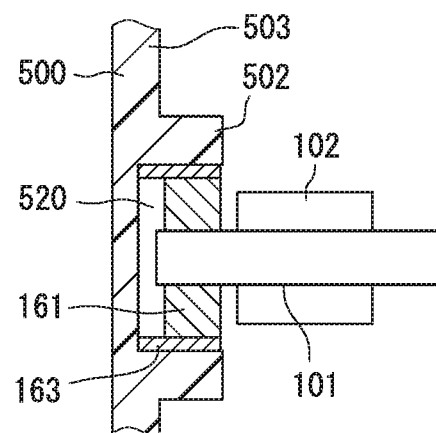
FIG. 27 is a cross-sectional view of a bearing space in the cover according to a modified example.

The portion of the cover 500 where the collar 161 is disposed requires a certain strength. Therefore, the portion of the cover 500 is formed as a thick portion. On the other hand, weight saving for the cover 500 is also required. Therefore, as shown in FIG. 27, a thick portion 502 may be formed in only a circumferential area of the bearing space 520 and the remaining portion may be formed as a thin portion 503. Since the load applied to the motor bearing 161 is supported by the thick portion 502, bending due to the deformation of the resin can be avoided. The thin portion 503 is formed with ribs 501 at appropriate positions to have necessary strength.

Further, in the above-mentioned example, the bearing space 520 of the cover 500 is formed by protruding away from the body 300. However, as shown in FIG. 27, a surface opposite to the body 300 may be formed as a flat surface. By making this surface flat, it is possible to suppress wraparound of the resin injected when the collar 163 is insert-molded. As a result, welds caused by such resin wraparound are less likely to occur, and the strength of the cover 500 is improved.

Figure 28:
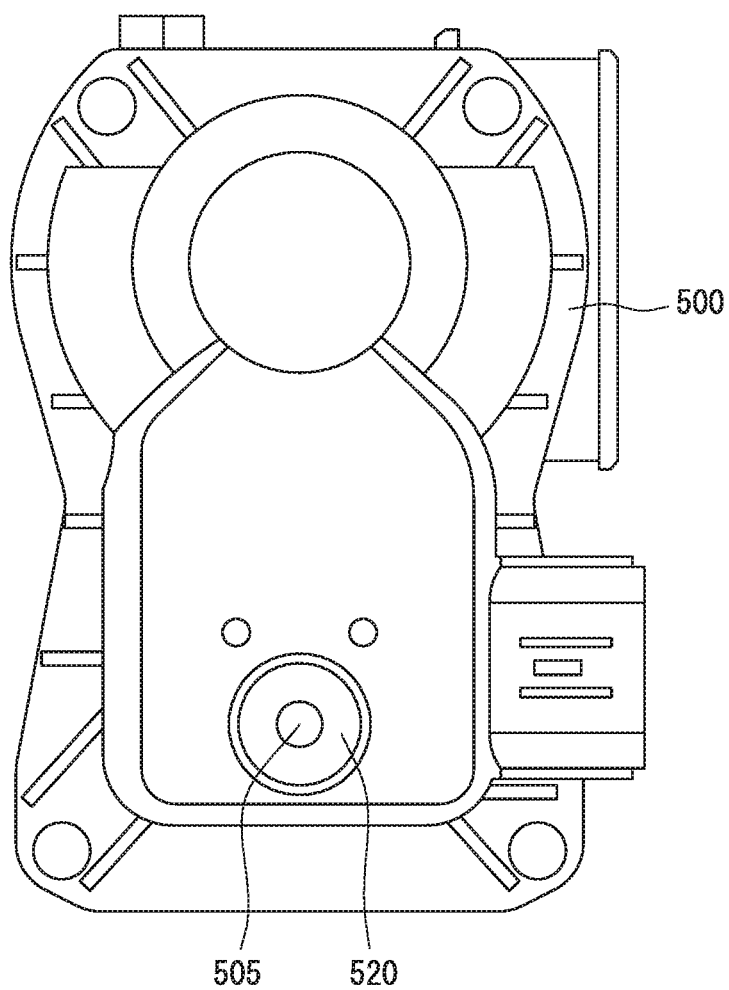
FIG. 28 is a rear view of the cover.

Further, as shown in FIG. 28, a gate 505 for injecting resin may be formed at the center of the bearing space 520 of the cover 500. As a result, generation of welds around the collar 163 can be suppressed.

Figure 29:
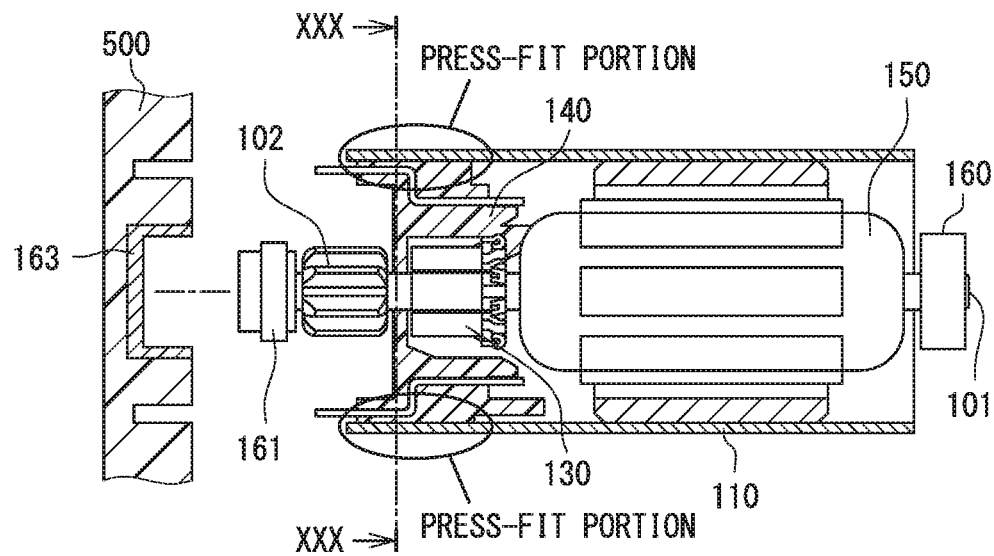
FIG. 29 is a cross-sectional view of the motor yoke.

FIG. 29 shows a cross-section of the motor, and the brush holder 140 is press-fitted into the motor yoke 110. In particular, as shown in FIG. 30, the brush holder 140 is press-fitted so that the entire circumference thereof comes into contact with the inner surface of the motor yoke 110.

Figure 30:
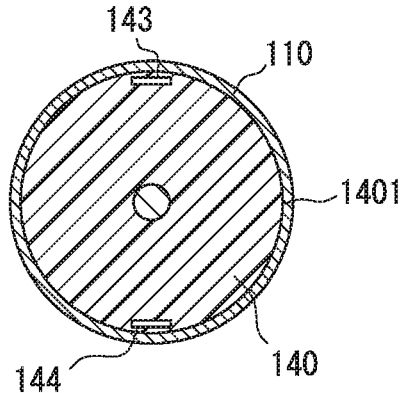
FIG. 30 is a cross-sectional view taken along XXX-XXX in FIG. 29.

In this example, as shown in FIGS. 29 and 30, since the entire outer circumference of the brush holder 140 is covered with the motor yoke 110 and therefore there is no gap therebetween, foreign matter can be effectively prevented from entering the commutator 130 or the armature core 150. The foreign matter includes abrasion powders and the like from the coil spring 450 arranged above.

In addition, since the brush holder 140 is press-fitted into an open end of the motor yoke 110 and fixed over the entire circumference thereof, positional accuracy of the brush holder 140 is improved. As a result, the accuracy of assembly of the brush holder 140 with the mating cover 500 is also improved. As a result, fitting between the terminals 143, 144 of the brush holder 140 and the terminals 530, 531 formed in the cover 500 is also improved.

Further, since the positional accuracy of the brush holder 140 is improved, the positional accuracy of the brush 141 is also improved. As a result, the pressing force by the brush 141 against the commutator 130 is stabilized, the slidability of the brush 141 is improved, and the rotation torque of the motor 100 is reduced. At the same time, the brush 141 and the commutator 130 are smoothly in contact with each other, and hunting due to vibration of the brush 141 is suppressed.

Figure 31:
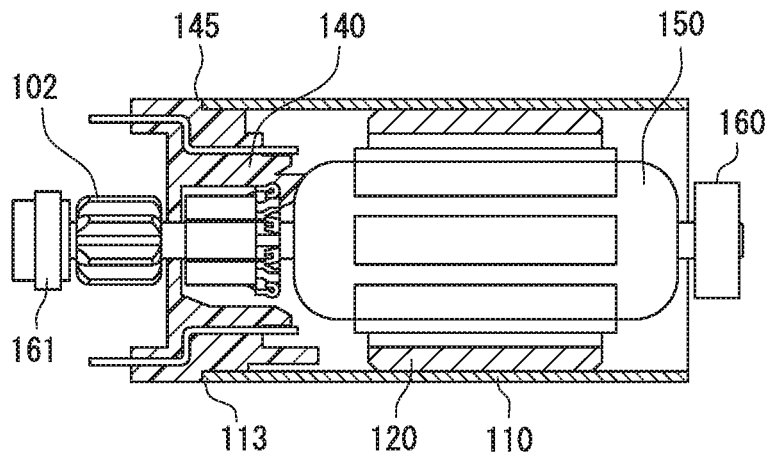
FIG. 31 is a cross-sectional view showing a brush holder according to a modified example.

As shown in FIG. 31, the brush holder 140 may have a step portion 145 formed on the outer circumference thereof, and the positioning step portion 145 may be brought into contact with an tip end 113 of the motor yoke 110. Accordingly, the tip end 113 at the open end of the motor yoke 110 is covered by the brush holder 140, and the effect of preventing foreign matter from entering is further improved. In addition, the positional accuracy of the brush holder 140 in the axial direction is further improved, and the axial lengths of both the brush 141 and the commutator 130 can be minimum lengths, which leads to downsizing of the electronic throttle device 1.

Figure 32:
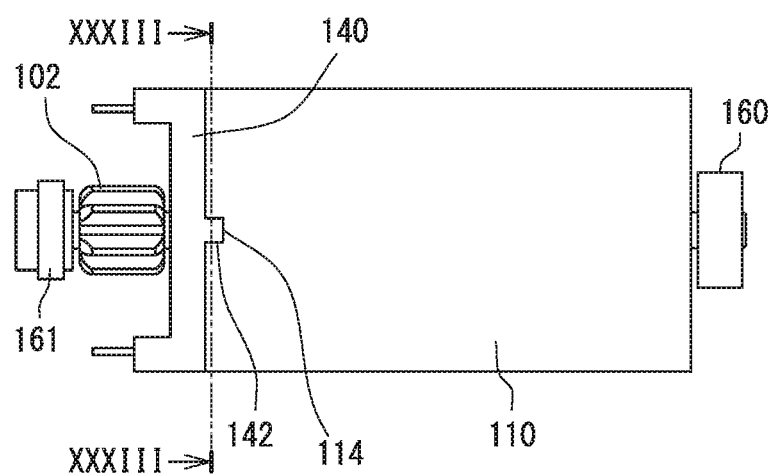
FIG. 32 is a front view of the motor yoke in which the brush holder shown in FIG. 31 is inserted.
Figure 33:
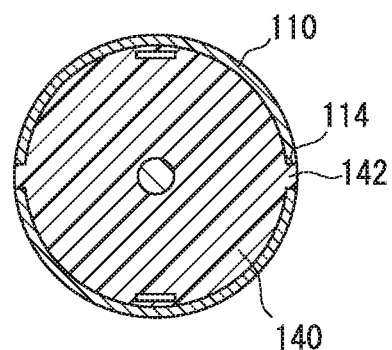
FIG. 33 is a cross-sectional view taken along XXXIII-XXXIII in FIG. 32.

FIG. 32 is a front view of the motor yoke 110 in which the brush holder 140 shown in FIG. 31 is inserted. FIG. 33 shows a cross-section taken along the line XXXIII-XXXIII of the motor yoke 110 of FIG. 32. Two recesses 114 are formed in the motor yoke 110. Two positioning protrusions 142 are fitted into the two recesses 114, and the motor yoke 110 and the brush holder 140 are positioned in the rotational direction.

In this example, in addition to press-fitting of the brush holder 140 over the entire circumference thereof, positioning in both the axial direction and the radial direction is performed. As a result, the positioning can be made more accurate, the fitting of the terminal can be improved as described above, the contact with the commutator can be made smoothly due to the improved positional accuracy of the brush, and the electronic throttle device 1 can be further downsized. However, although it is desirable to provide the recesses and the protrusions for regulating the rotation as in this example, positioning can be done even in the example of FIG. 30 by using the terminals 143 and 144.

Figure 34:
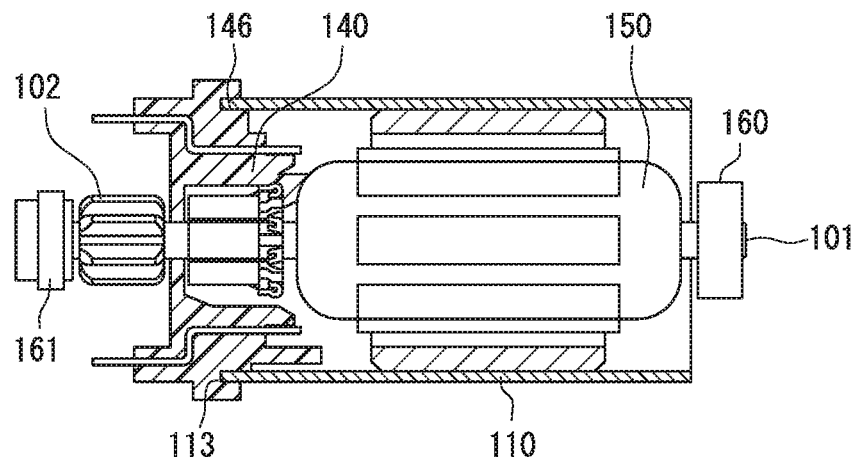
FIG. 34 is a cross-sectional view showing a brush holder according to a modified example.
Figure 35:
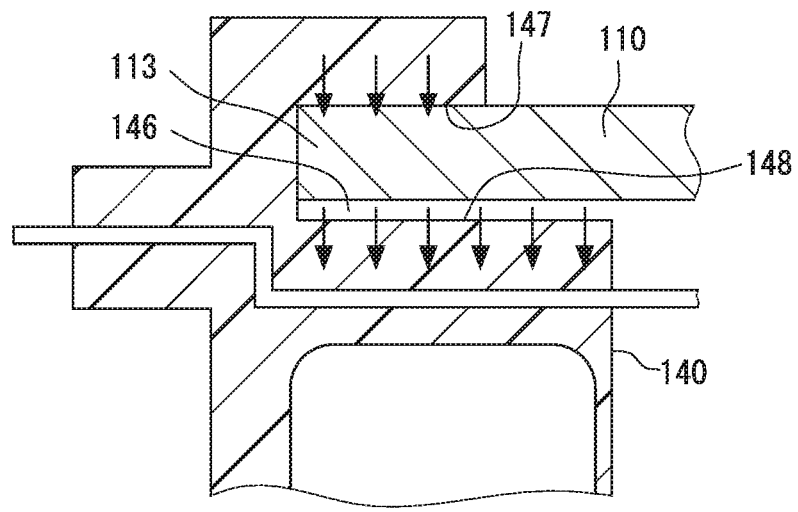
FIG. 35 is a partially enlarged view of FIG. 34.

FIG. 34 is a cross-sectional view showing a modified example of the brush holder 140. As in this example, an annular recess 146 may be formed in the brush holder 140, and the tip end 113 of the motor yoke 110 at the open end may be press-fit into the annular recess 146. Since the resin brush holder 140 and the metal motor yoke 110 have different coefficients of thermal expansion, the brush holder 140 having a greater coefficient of thermal expansion has a larger deformation depending on temperature. As shown in FIG. 35, even if the brush holder 140 thermally contracts at a low temperature, an outer surface 147 of the annular recess 146 comes into close contact with the outer circumferential surface of the motor yoke 110 to prevent foreign matter from entering. On the contrary, even if the brush holder 140 thermally expands at a high temperature, an inner surface 148 of the annular recess 146 comes into close contact with an inner circumferential surface of the motor yoke 110, and foreign matter is also prevented from entering.

Figure 36:
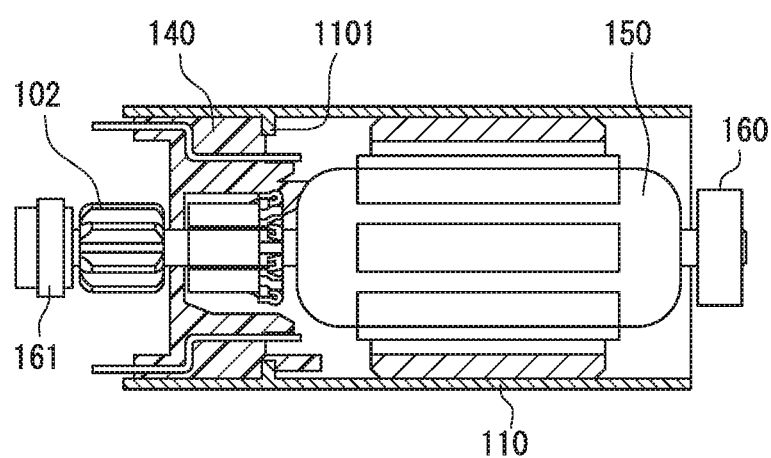
FIG. 36 is a cross-sectional view showing the motor yoke according to a modified example.

As shown in FIG. 36, a positioning protrusion 1101 may be stamped and formed on the motor yoke 110, and a surface of the brush holder 140 close to the armature core 150 may be brought into contact with the protrusion 1101. The protrusion 1101 can provide more accurate positioning.

Figure 37:
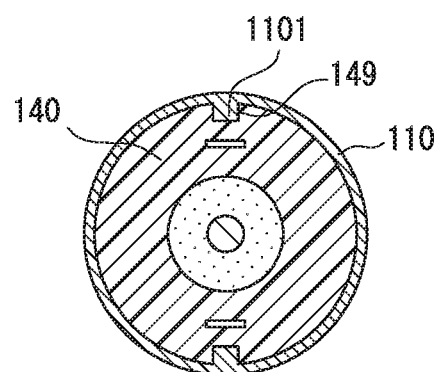
FIG. 37 is a cross-sectional view taken along XXXVII-XXXVII in FIG. 38.

In the example of FIG. 36, the protrusion 1101 is brought into contact with the surface of the brush holder 140 close to the side of the armature core 150. However, as shown in FIG. 37, a slit 149 may be formed on an outer circumferential surface of the brush holder 140 and protrusion 1101 may be press-fit into the slit 1101. By engaging the protrusion 1101 with the slit 149, the brush holder 140 can be positioned in the circumferential direction.

Figure 38:
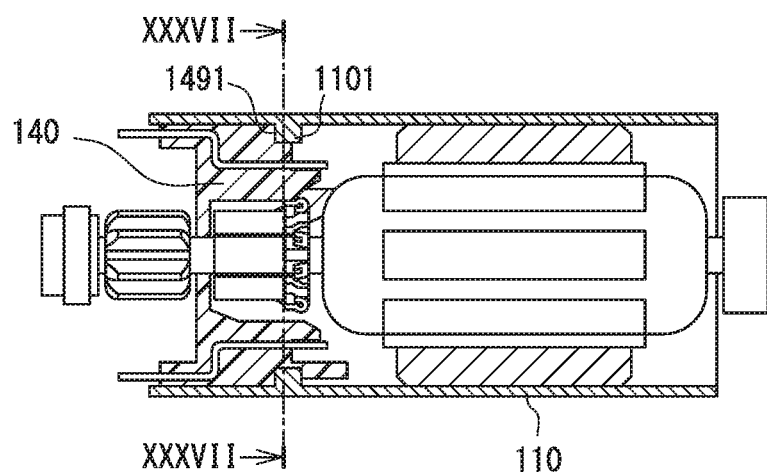
FIG. 38 is a cross-sectional view of the motor yoke and the brush holder according to a modified example.

Since the brush holder 140 is press-fitted into the motor yoke 110 in the axial direction, the protrusion 1101 comes in contact with the end surface 1491 of the slit 149 during press-fitting as shown in FIG. 38. In the example of FIG. 38, the protrusion 1101 and the slit 149 are engaged with each other, whereby the brush holder 140 can be positioned in both the circumferential direction and the axial direction.

Figure 39:
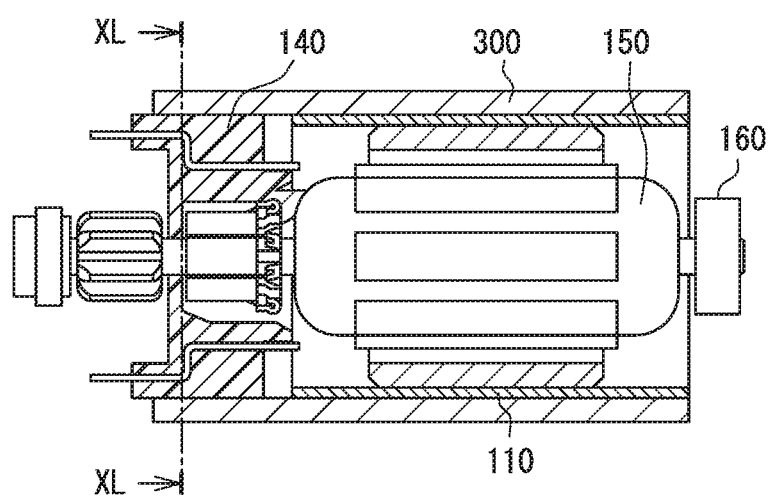
FIG. 39 is a cross-sectional view of an example in which the brush holder is pressed into the body.

In the above example, the brush holder 140 is press-fitted into the motor yoke 110, but it may be press-fitted into the body 300 instead of the motor yoke 110. As described in the example of FIG. 20, the motor yoke 110 minimally requires a portion facing the magnets 120, and thus the motor yoke 110 may eliminate a portion facing the brush holder 140. In this case, as shown in FIG. 39, the brush holder 140 is directly press-fitted into the body 300.

Figure 40:
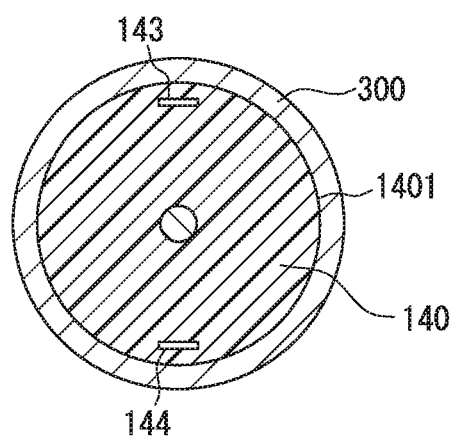
FIG. 40 is a cross-sectional view taken along the line XL-XL in FIG. 39.

Even if the brush holder 140 is directly press-fitted into the body 300 in this way, the brush holder 140 is in close contact with the body 300 over the entire circumference thereof as shown in FIG. 40 and prevents foreign matter from entering toward the armature core 150. The positioning accuracy improved by bringing the entire outer circumferential surface of the brush holder 140 into close contact is the same as that of pressing into the motor yoke 110 shown in FIGS. 29 and 30.

Figure 41:
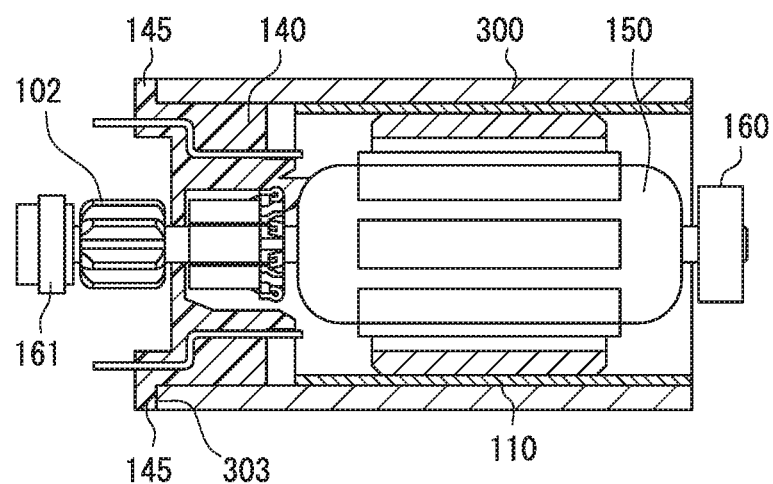
FIG. 41 is a cross-sectional view showing a brush holder according to a modified example.

When press-fitting the brush holder 140 into the body 300, the brush holder 140 may be provided with a positioning step 145 as shown in FIG. 41 so that the step 145 comes into contact with the open end 303 of the body 300 during press-fitting. This contact makes it possible to cover the body 300, prevent the intrusion of foreign matter, and improve the positional accuracy, as with the example described in the example of FIG. 31.

Figure 42:
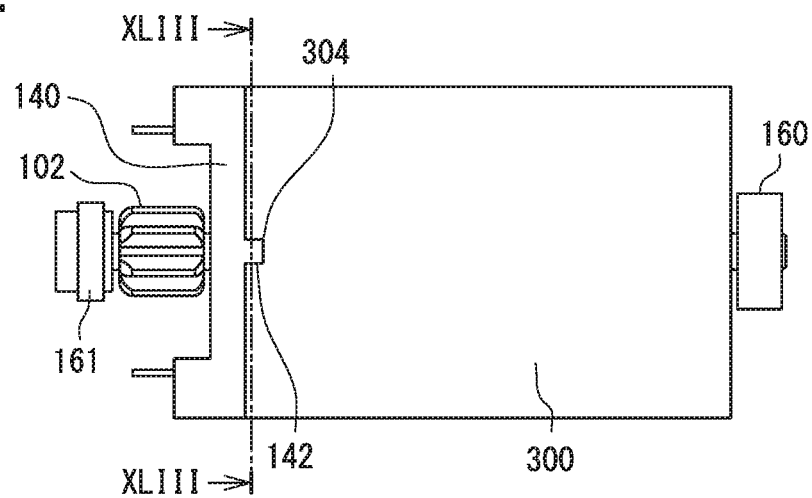
FIG. 42 is a front view of the motor yoke in which the brush holder shown in FIG. 41 is inserted.
Figure 43:
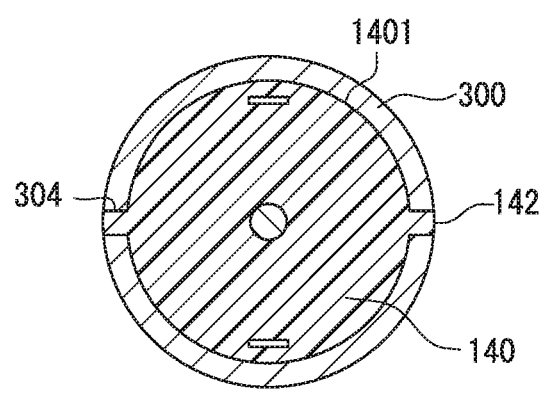
FIG. 43 is a cross-sectional view taken along the line XLIII-XLIII in FIG. 42.

A positioning protrusion 142 may be formed in the brush holder 140 and fitted into a positioning recess 304 formed on the body 300 as shown in FIGS. 42 and 43. This further improves the positioning accuracy in both the axial direction and the circumferential direction, as with the examples of FIGS. 32 and 33.

Figure 44:
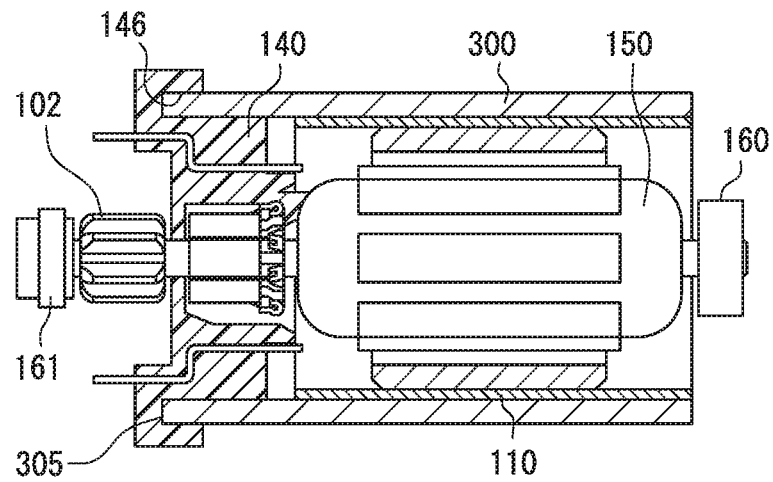
FIG. 44 is a cross-sectional view showing a brush holder according to a modified example.
Figure 45:
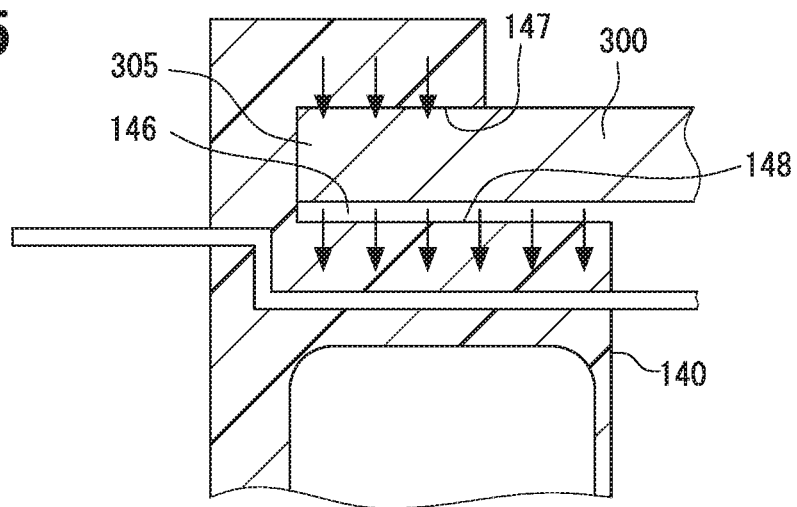
FIG. 45 is a partially enlarged view of FIG. 44.

Further, as shown in FIG. 44, an annular recess 146 may be provided in the brush holder 140, and an annular protrusion 305 of the body 300 may be fitted into the annular recess 146. As shown in FIG. 45, the gap between the annular recess 146 and the opening 306 of the motor space 330 of the body 300, which may be generated due to thermal contraction or thermal expansion, can be eliminated by the annular recess outer surface 147 or the annular recess inner surface 148 of the brush holder 140, which is similar to the example of FIGS. 34 and 35.

Figure 46:
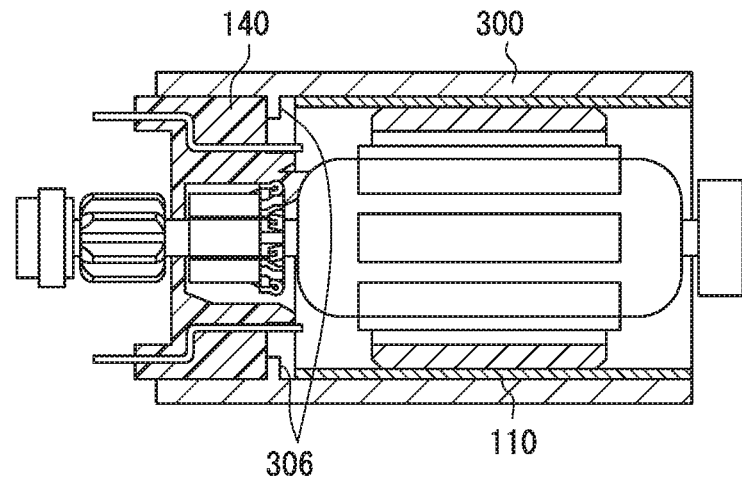
FIG. 46 is a cross-sectional view showing the body according to a modified example.
Figure 47:
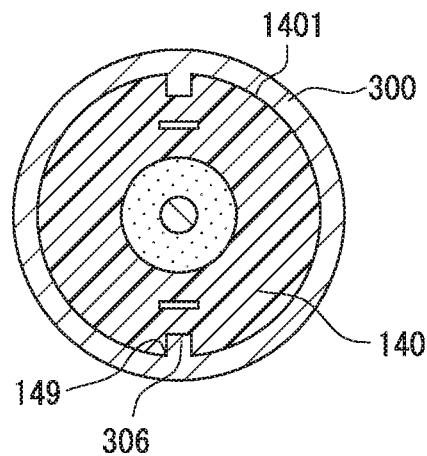
FIG. 47 is a cross-sectional view taken along the line XLVII-XLVII in FIG. 48.
Figure 48:
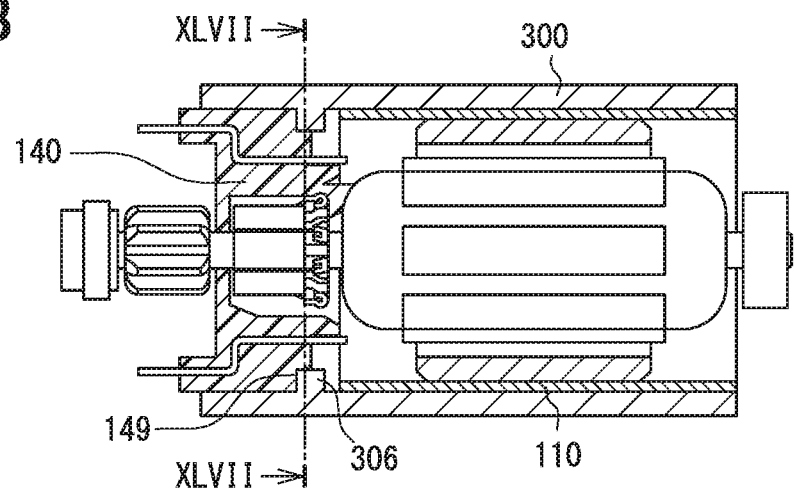
FIG. 48 is a cross-sectional view of the body and the brush holder according a modified example.

As shown in FIG. 46, a protrusion 306 may be formed in the body 300, and the end face of the brush holder 140 may be brought into contact with this protrusion 306 to secure axial positioning. Alternatively, as shown in FIG. 47, the protrusion 306 may be fitted into the slit 149 of the brush holder 140 to secure circumferential positioning. Furthermore, as shown in FIG. 48, the protrusion 306 may be fitted into the slit 149 to secure both axial and circumferential positioning. These are similar to the examples of FIGS. 36 to 38.

In FIG. 39, the brush holder 140 is press-fitted into the body 300 with a gap between the motor yoke 110 and the brush holder 140. However, the brush holder 140 may be brought into contact with an end surface of the motor yoke 110 to be positioned in the axial direction. In this case, it is not necessary to form a protrusion or the like for positioning the brush holder 140 in the axial direction, and therefore its structure can be simplified.

Although the examples of FIGS. 39 to 48 show only the peripheral portion of the inner motor yoke 110 of the body 300, the shape of the body 300 is, as shown in FIG. 1, is a vertically elongated shape having the intake passage 320 in the upper side and the motor space 330 in the lower side, and only a part around the motor space 330 is illustrated. The motor space 330 has a cylindrical shape in accordance with the shape of the motor yoke 110. The annular protrusion 305 of FIGS. 44 and 45 is formed to protrude at a position around the motor yoke 110 in the motor space 330 of the body 300.

Figure 49:
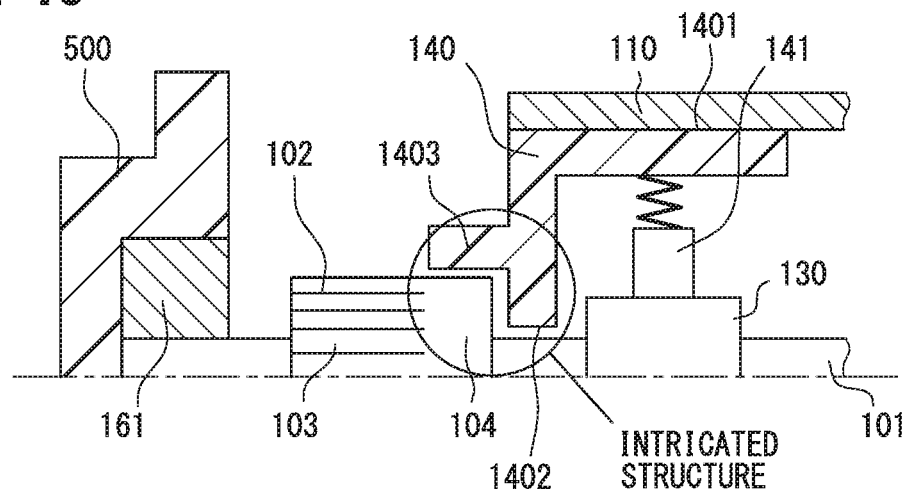
FIG. 49 is a cross-sectional view showing a brush holder according to a modified example.

In the example described above, foreign matter is prevented from entering by the outer circumferential surface 1401 of the brush holder 140 which is brought into close contact with the motor yoke 110 or the body 300. However, as shown in FIG. 49, a predetermined gap between the inner circumferential surface 1402 of the brush holder 140 and the motor shaft 101 may be formed so as not to interfere with rotation of the shaft 101. Therefore, an annular cover member 1403 is formed in the brush holder 140, and an outer circumference of the motor pinion 102 is covered with the cover member 1403 to form an intricate structure, which prevents foreign matter from entering toward the commutator 130.

In the example of FIG. 49, the motor pinion 102 includes a pinion portion where the pinion gear 103 is formed and a cylindrical portion 104 where no gear is formed, and the cover member 1403 faces the inner cylindrical portion 104 of the motor pinion 102. Therefore, the gap between the cover member 1403 and the cylindrical portion 104 constantly extends, which is desirable as an intricate structure. However, as shown in FIG. 50, the pinion gear 103 may be formed over the entire length of the motor pinion 102, and even in this case, the effect of preventing foreign matter from entering by the intricate structure can be obtained.

Figure 50:
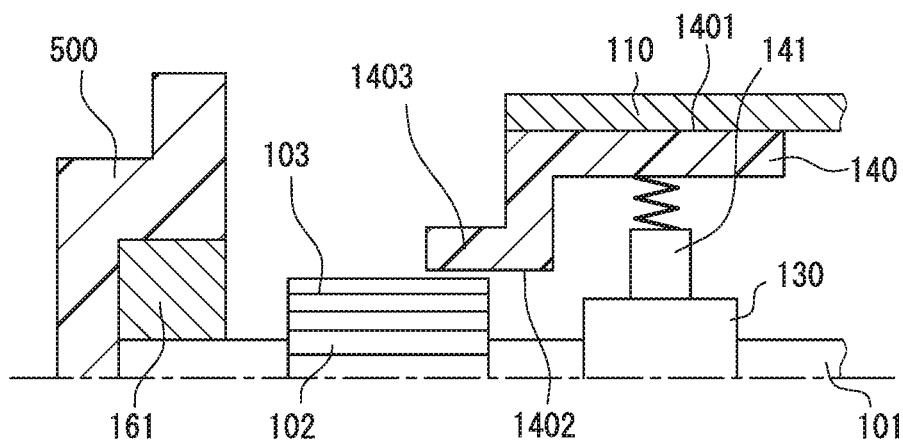
FIG. 50 is a cross-sectional view showing the motor pinion and the brush holder according to a modified example.
Figure 51:
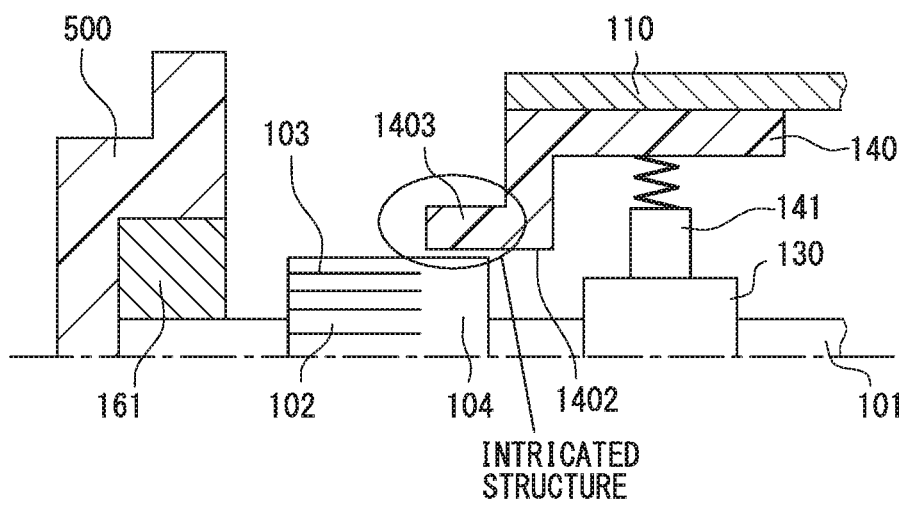
FIG. 51 is a cross-sectional view showing the motor pinion and the brush holder according to a modified example.

Further, as shown in FIGS. 50 and 51, the inner circumferential surface of the cover member 1403 may be an inner circumferential surface 1402 of the brush holder. As described above, abrasion powders of the coil spring 450 have been described as an example of the foreign matter. However, even with the intricate structure having only the cover member 1403, the gap between the cover member 1403 and the motor pinion 102 can be small, and thus the foreign matter intrusion prevention effect can be obtained.

Figure 52:
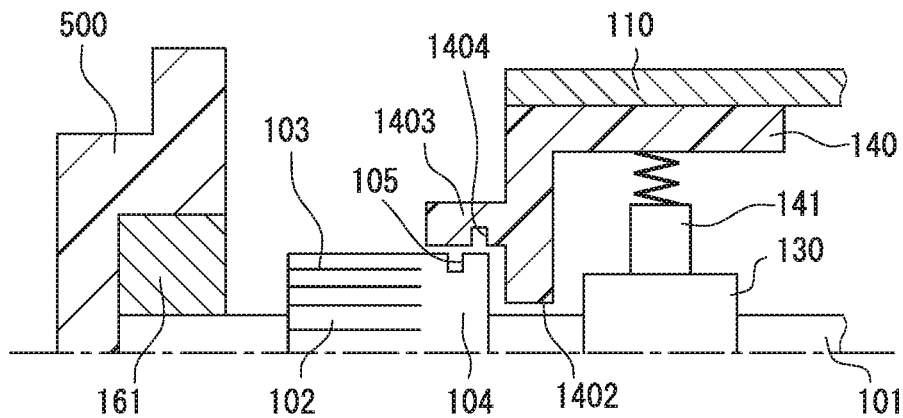
FIG. 52 is a cross-sectional view showing the motor pinion and the brush holder according to a modified example.

As shown in FIG. 52, a trap groove 1404 may be formed on the inner circumferential surface of the cover member 1403 of the brush holder 140, and a trap groove 105 may be formed on the outer circumferential surface of the cylindrical portion 104 of the motor pinion 102. Then, an intricate structure may be formed by offsetting both the grooves 1404, 105 from each other. Accordingly, foreign matter that has entered the gap between the cover member 1403 and the motor pinion 102 can be captured by the trap grooves 1404 and 105.

A plurality of trap grooves 1404 and 105 may be formed on both the cover member 1403 and the motor pinion 102, and alternatively, a plurality of trap grooves 1405, 105 may be formed on only one of the cover member 1403 and the motor pinion 102.

In the above example, the foreign matter invasion prevention effect for the brush holder 140 of the motor yoke 110 has been described. In the present example, the motor yoke 110 is open at the deep side of the motor yoke 110 (i.e., the right side in FIG. 1), and therefore the motor bearing 160 is directly supported by the body 300.

Here, since the motor 100 is a single heat source for the electronic throttle device 1, the temperature of the motor 100 can be higher than an ambient temperature by 5 to 10° C. This is because the motor 100 frequently repeats rotation based on signals from an engine control unit (not shown), the motor 100 always receives a force from the coil spring 450 in order to hold the throttle valve 400 at a predetermined position, and a driving force for obtaining a certain torque is required.

Since the electronic throttle device 1 is arranged in the engine compartment of the vehicle, the ambient temperature greatly varies from a low temperature when starting the engine during a severe winter season to a high temperature when operating the engine with a high speed during midsummer. However, in any situation, the motor 100 has the highest temperature in the electronic throttle device 1.

In this example, heat generated in the motor coil 151 can be radiated directly to the body 300 via the motor shaft 101 and the motor bearing 160, and thus heat radiation can be improved. In particular, since the motor bearing 160 is press-fitted into the body 300, the contact area between the motor bearing 160 and the body 300 is expanded, which contributes to the improvement of heat radiation.

Further, heat generated in the motor coil 151 and transferred to the motor yoke 110 can also be radiated directly to the body 300, thereby improving the heat radiation performance of the motor 100. Since the motor yoke 110 is also directly press-fitted into the body 300, the contact area can be expanded and therefore the heat radiation can be improved similar to the motor bearing 160.

Figure 53:
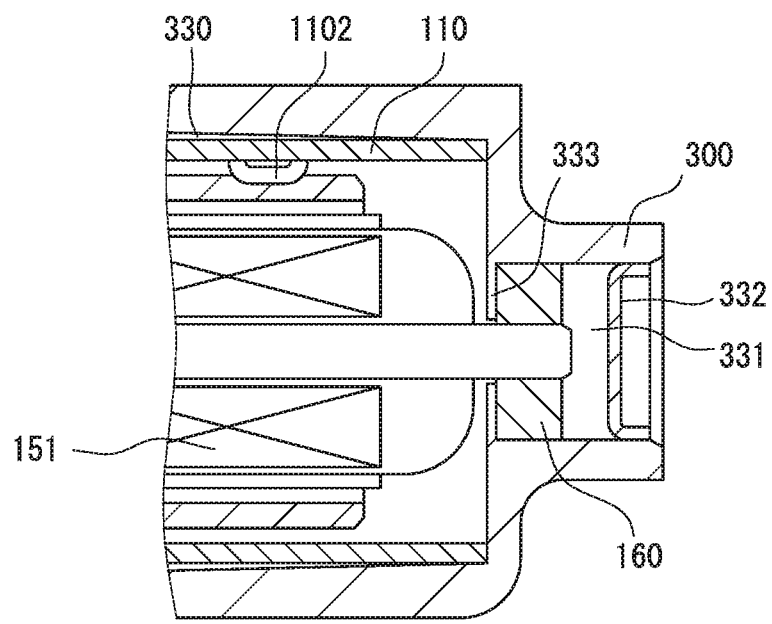
FIG. 53 is a cross-sectional view showing a motor bearing of the body.

As shown in FIG. 53, a bearing engaging portion 333 is formed between the motor space 330 of the body 300 and the motor opening 331, and axial positioning for the motor bearing 160 can be achieved by coming into contact with bearing engaging portion 333. Since the motor opening 331 is formed in the die-cast body 300 by cutting, the bearing engaging portion 333 can also be formed accurately. Therefore, by abutting the motor bearing 160 against the bearing locking portion 333, positional accuracy of the motor bearing 160 also increases. In addition, the contact area between the motor bearing 160 and the body 300 is enlarged, which contributes to the improvement of heat radiation.

Further, when the motor bearing 160 is a sintered metal impregnated with oil, the swelling of the oil at a high temperature may flow out. However, the bearing engaging portion 333 can prevent the oil from entering the motor space 330 toward the motor coil 151.

Figure 54:
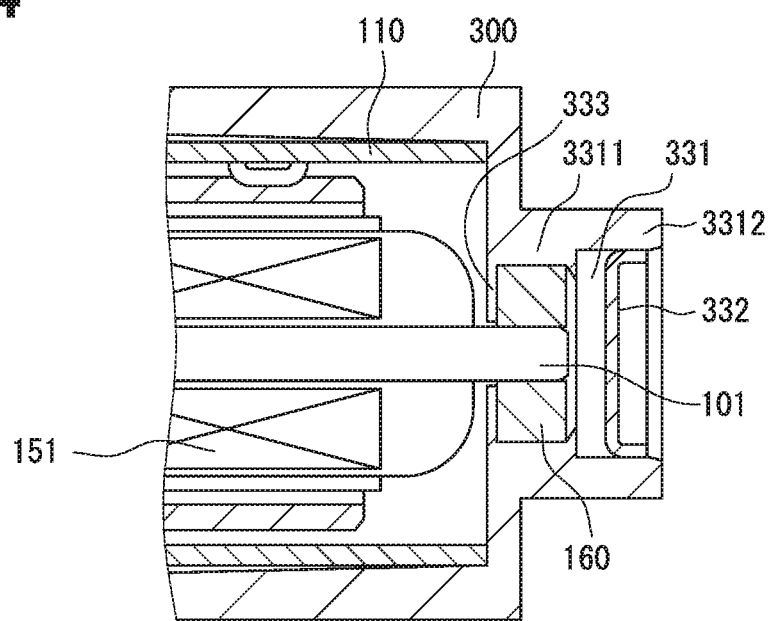
FIG. 54 is a cross-sectional view showing the motor bearing of the body according to a modified example.

As shown in FIG. 54, the motor opening 331 of the body 300 may have a stepped shape, the motor bearing 160 may be disposed in a small diameter portion 3311, and the motor plug 332 may be disposed in a large diameter portion 3312. In this case, the motor bearing 160 can be crimped and fixed at the stepped portion of the motor opening 331. By crimping, even when a fixing force between the body 300 and the motor bearing 160 by press-fitting decreases due to thermal expansion or the like, the motor bearing 160 can be reliably held.

Figure 55:
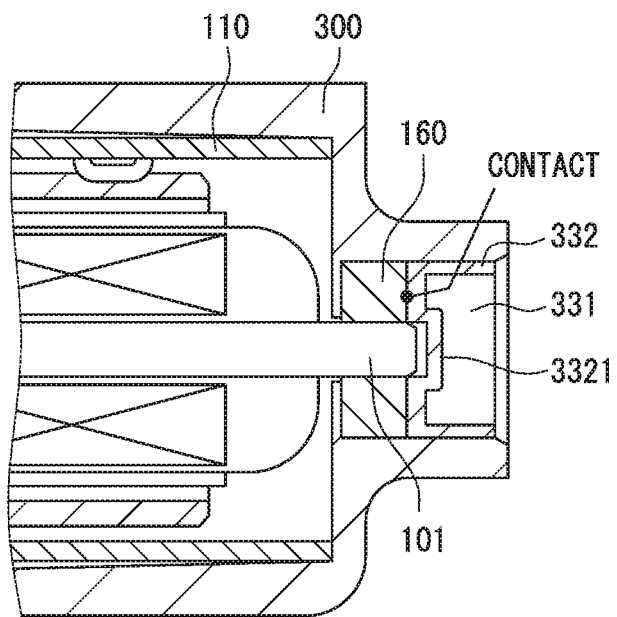
FIG. 55 is a cross-sectional view showing the motor bearing of the body according to a modified example.

Further, as shown in FIG. 55, the motor plug 332 may be brought into contact with the motor bearing 160. In this case, the motor plug 332 can prevent the motor bearing 160 from being displaced. In this case, it is desirable to provide a recess 3321 at a position of the motor plug 332 facing the motor shaft 101 to prevent interference with the motor shaft 101 by the motor plug 332.

Figure 56:
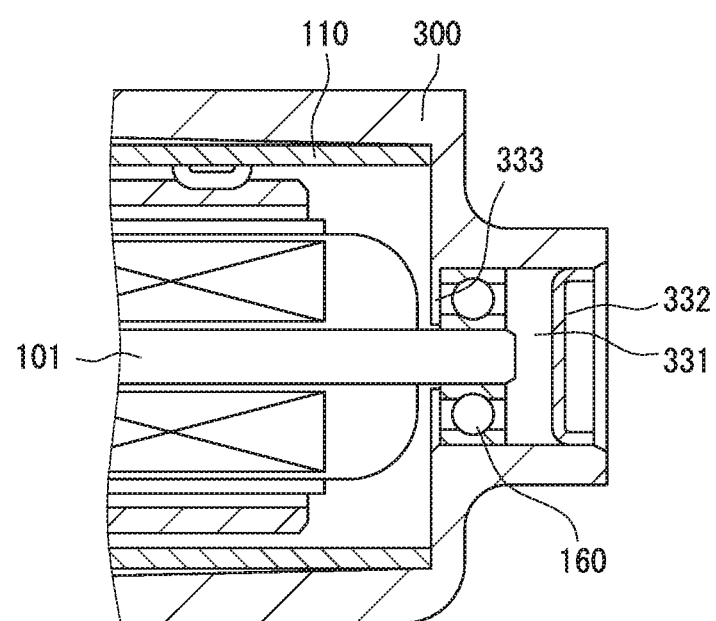
FIG. 56 is a cross-sectional view showing the motor bearing of the body according to a modified example.

As described above, the motor bearings 160 and 161 may be oil-impregnated sintered metal or ball bearings. FIG. 56 shows an example in which the motor bearing 160 is a ball bearing. Such a ball bearing can also radiate heat from the motor shaft 101 to the body 300.

Figure 57:
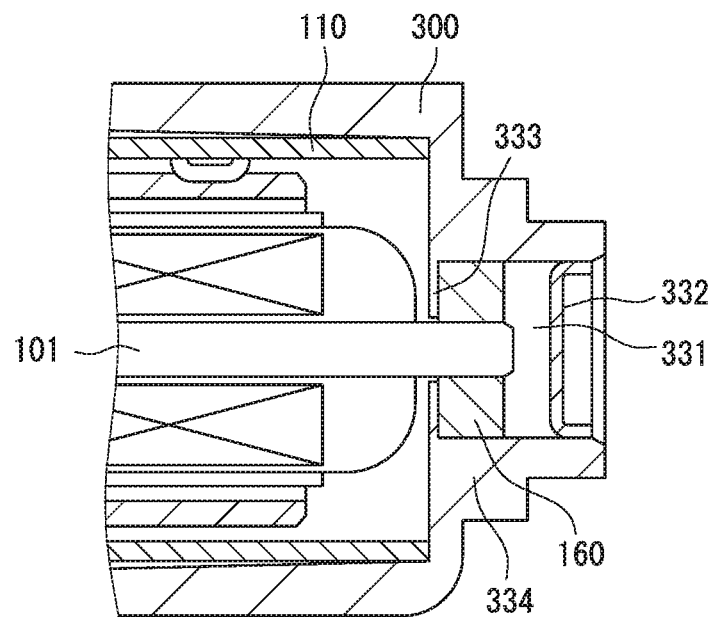
FIG. 57 is a cross-sectional view showing the motor bearing of the body according to a modified example.

Further, as shown in FIG. 57, a bearing support portion 334 for supporting the motor bearing 160 in the body 300 may be formed as a thick portion. By increasing its thickness in this way, heat transferred to the motor bearing 160 from the motor shaft 101 can be effectively radiated to the body 300. In addition, since the motor bearing 160 is more firmly supported, loosening can be prevented. In addition, it is possible to suppress deformation of the motor opening 331 of the body 300 when the motor plug 332 is press-fitted.

Figure 58:
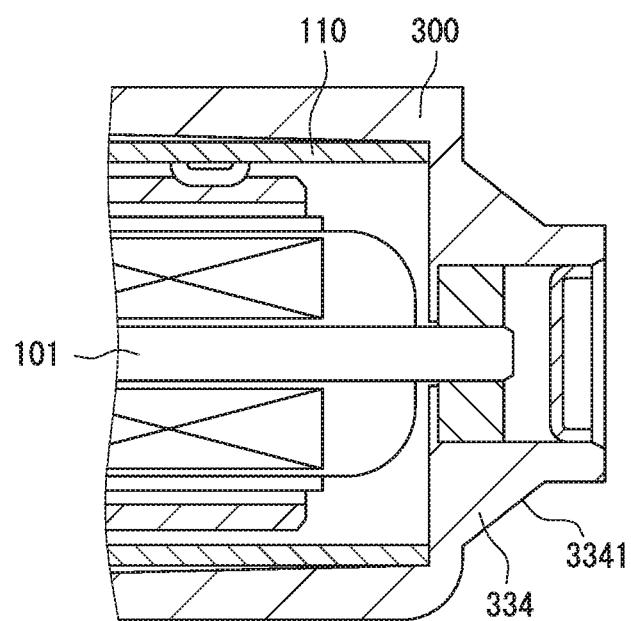
FIG. 58 is a cross-sectional view showing the motor bearing of the body according to a modified example.
Figure 59:
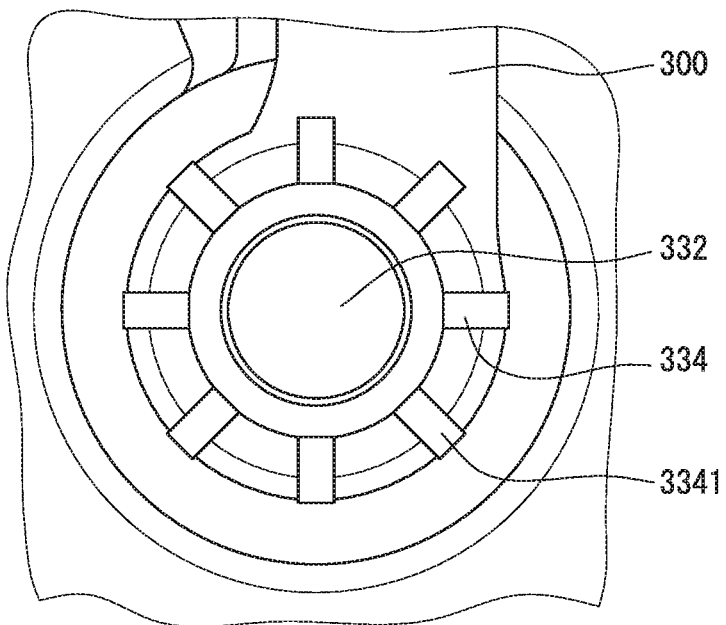
FIG. 59 is a right side view of FIG. 58.

Instead of increasing the rigidity of the bearing support portion 334 by thickening the bearing support portion 334, ribs 3341 may be formed in the bearing support portion 334 as shown in FIGS. 58 and 59. The ribs 3341 also increase the rigidity of the bearing support portion 334 and prevent the motor bearing 160 from loosening. Further, since the ribs 3341 increase a heat radiation area of the bearing support portion 334, the heat radiation performance can be further improved.

Figure 60:
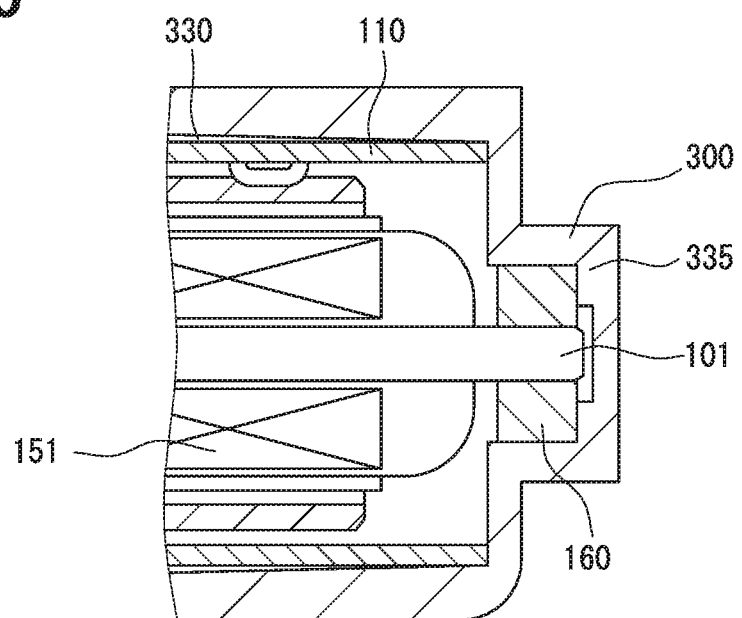
FIG. 60 is a cross-sectional view showing the motor bearing of the body according to a modified example.

In the example described above, the motor bearing 160 is press-fitted through the motor opening 331 of the body 300 to assemble the motor bearing 160. However, as shown in FIG. 60, a bearing engaging portion 335 may be formed in the body 300, and the motor bearing 160 may be press-fitted from the motor space 310. In this example, the motor bearing 160 is brought into contact with the bearing engaging portion 335 to be positioned in the axial direction. Since the bearing engaging portion 335 has a stepped shape, interference with the motor shaft 101 can be avoided.

Figure 61:
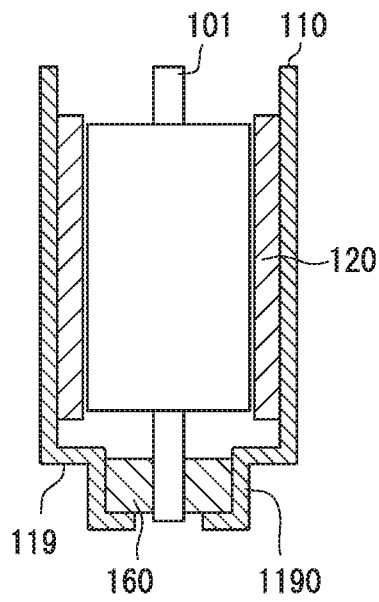
FIG. 61 is a cross-sectional view showing the motor yoke according to a modified example.

Further, in the above-mentioned example, the motor bearing 160 is press-fitted into the body 300 to improve the heat radiation performance for the motor 100. However, as shown in FIG. 61, a bearing support portion 1190 may be formed by forming the bottom 119 of the motor yoke 110 into a protruding shape. By directly holding the motor bearing 160 in the motor yoke 110, the relative positional accuracy between the motor yoke 110 and the motor bearing 160 can be improved. In the example of FIG. 61, since the shape of the motor yoke 110 is complicated, the motor yoke 110 is formed by being drawn from a plate material.

Figure 62:
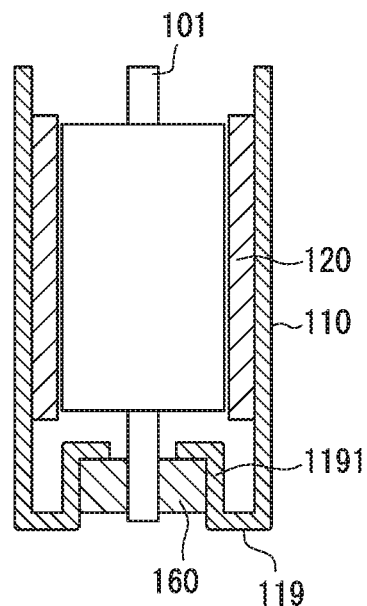
FIG. 62 is a cross-sectional view showing the motor yoke according to a modified example.

Further, as shown in FIG. 62, the motor yoke 110 may be bent and the bottom portion 119 may have a concave shape so that a bearing support portion 1191 is formed. Accordingly, the relative position accuracy of the motor yoke 110 and the motor bearing 160 is improved. Further, if the motor bearing 160 is a sintered metal impregnated with oil, the swelling of the oil at a high temperature may flow out. However, the bearing support portion 1191 can prevent the oil from entering the motor space 330 toward the motor coil 151.

Next, an assembly process of the electronic throttle device 1 of the present embodiment will be described.

First, assembly of the motor 100 will be described. The motor shaft 101 is press-fitted into the armature core 150 and the commutator 130, and the motor coil 151 is wound in the slot of the armature core 150 using a winding machine so as to form a sub-assembly.

Then, the motor yoke 110 is formed in a cylindrical shape, and a holding portion 1102 (FIG. 80) for holding the arc-shaped magnets 120 is formed on the motor yoke 110 to protrude inward. Then, the magnets 120 are arranged inside the motor yoke 110, and the magnets 120 are pressed against the holding portion 1102 by a spring 605 (see FIG. 79, FIG. 80) to form a sub-assembly.

At the same time, a spring that presses the two brushes 141 toward the commutator 130 is attached to the brush holder 140 in which the terminals 143 and 144 are insert-molded or press-fitted to form a sub-assembly.

Since the assembly to the body 300 is always performed from one direction, the motor bearing 160 is press-fitted through the motor opening 331 of the body 300, and then the body 300 is turned over. After turning over, the sub-assembly of the motor yoke 110 is press-fitted into the motor space 330 of the body 300 from the open end 303. At this time, after the motor yoke 110 is press-fitted into the body 300, the magnets 120 and the spring 605 for pressing the magnets 120 may be assembled.

Next, the sub-assembly in which the armature core 150 and the like are connected to the motor shaft 101 is attached from the open end 303, and the motor shaft 101 is supported by the motor bearing 160. After that, sub-assembly of the brush holder 140 is press-fitted to close the open end of the motor yoke 110. Next, the motor pinion 102 is connected to the motor shaft 101. When the motor pinion 102 is connected, the motor shaft 101 is supported by the motor opening 331.

Next, the cover 500 having the motor bearing 161 is attached, the open end 303 of the body 300 is closed, then the body 300 is returned over again, and the motor opening 331 is closed by the motor plug 332. The cover 500 is attached in accordance with assembly of the valve gear 210 and the intermediate gear 201, which will be described below.

Although the above is the preferable assembling process of the motor 100, the process can be appropriately changed. For example, the magnets 120 may be disposed in the motor yoke after the motor yoke 110 is press-fitted into the body 300.

Next, assembly of the throttle shaft 402 and the valve gear 210 will be described.

First, the bearing 406 is connected to the throttle shaft 402 at a predetermined position to form a sub-assembly. Further, the bearing 405 is press-fitted from the opening 302 of the body 300. Next, the body 300 is turned over, the sub-assembly of the throttle shaft 402 and the bearing 406 is inserted into the body 300 and is supported by the bearing 160, and then the bearing 406 is press-fitted into the body 300. Thereafter, the throttle valve 400 is fixed to the throttle shaft 402 with the screws 403.

Then, the spring gear sub-assembly, which is formed by attaching the guides 460, 461 to the coil spring 450, and the valve gear 210 are attached from the open end 303 of the body 300. The valve gear 210 is fixed to the throttle shaft 402 by swaging the lever 401 which is insert-molded on the valve gear 210.

Next, assembly of the intermediate gear 201 will be described.

First, the intermediate shaft 203 is press-fitted into the fitting hole 301 of the body 300, and then the press-fitted intermediate shaft 203 is loosely fitted into the intermediate gear 201. Then, the cover 500 is attached to the body 300 so that the intermediate shaft 203 is fitted into the guiding hole 506 of the cover 500 having the rotation angle sensor 510, and the open end 303 of the body 300 is closed. Thereafter, the body 300 is turned over again and the opening 302 is closed by the plug 310.

The outline of the assembling process is as described above, and the assembling of the body 300 and the cover 500 in this example will be further described in detail below.

In this example, as shown in FIG. 2, a positioning reference hole 307 is formed in an area of the body 300 around the inner motor 100. On the other hand, as shown in FIG. 3, a positioning reference pin 507 that is fitted into the positioning reference hole 307 is formed in the cover 500 to protrude. Further, as described above, when the cover 500 is attached to the body 300, the intermediate shaft 203 also engages with the guiding hole 506 of the cover 500.

Screw holes 3001, 3002, 3003, 3004 are formed at four corners of the body 300, and bolt holes 5001, 5002, 5003, 5004 are also formed at four corners of the cover 500 at positions facing the corresponding screw holes 3001, 3002, 3003, 3004. In the bolt holes 5001, 5002, 5003, and 5004 of the cover 500, metal collars are insert-molded to secure strength of the holes when bolt fastening.

In an assembling process of the body 300 and the cover 500, temporary assembly is performed. That is, the positioning reference pin 507 of the cover 500 is fitted into the positioning reference hole 307 of the body 300, and the intermediate shaft 203 of the body 300 is engaged with the guiding hole 506 of the cover 500. After the temporary assembly, bolts 4000 are screwed into the screw holes 3001, 3002, 3003, 3004 of the body 300 through the bolt holes 5001, 5002, 5003, 5004 of the cover 500, thereby completing the final assembly (see FIGS. 75 and 77).

When the bolts 4000 are tightened during the final assembling process after the temporary assembly, a slight positional deviation is inevitably generated between the body 300 and the cover 500. However, in this example, the clearance between the positioning reference hole 307 of the body 300 and the positioning reference pin 507 of the cover 500 is set to be smaller than the clearance between the intermediate shaft 203 of the body 300 and the guiding hole 506 of the cover 500. Therefore, the positional deviation is absorbed by the guiding hole 506 slightly moving around the positioning reference pin 507.

In a comparative structure, the positioning reference pin is formed at position around the valve gear 210. This is to increase the detection accuracy of the rotation angle sensor 510, but since the positioning accuracy at a position close to the valve gear 210 (i.e., an upper portion in FIG. 3) is increased, the positioning accuracy at a position close to the motor 100 (i.e., a lower portion in FIG. 3) is decreased.

On the contrary, in this example, since the positioning reference pin 507 is formed at a position close to the motor 100, the positioning accuracy of the portion close to the motor 100 is increased, and the deviation at the fitting portion between the terminals 530 and 531 of the cover 500 and the terminals 143 and 144 of the motor 100 can be reduced. As a result, the terminals 530 and 531 of the cover 500 and the terminals 143 and 144 of the motor 100 have a better contact condition, and the wear resistance between both terminals is improved.

Although the positioning accuracy of the portion close to the motor 100 is improved, the positioning accuracy of the portion close to the valve gear 210 is expected to decrease. However, the accuracy of the rotation angle sensor 510 may be compensated by correcting the output characteristic from the rotation angle sensor 510 with software.

Figure 63:
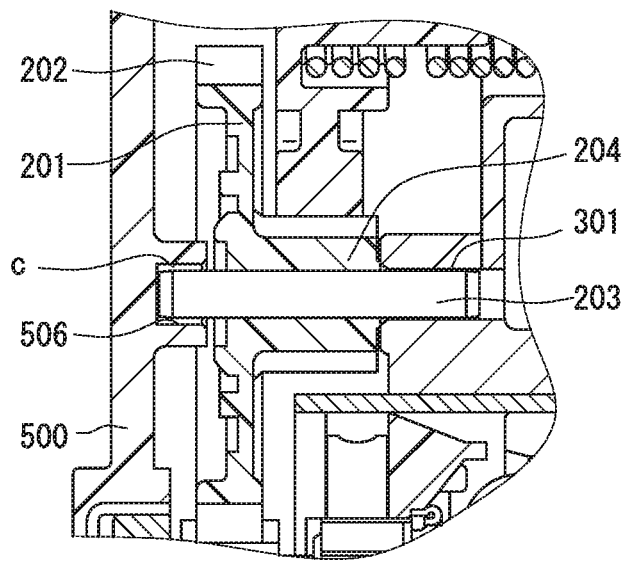
FIG. 63 is a cross-sectional view enlarging and illustrating an intermediate shaft in FIG. 2.

FIG. 63 illustrates with emphasis the relationship between the intermediate shaft 203 and the guiding hole 506 of the cover 500, but a gap "c", or a third gap, with several microns to several tens of microns in size is inevitably formed between the intermediate shaft 203 and the guiding hole 506. As described above, the gap c allows the positional deviation between the temporary assembly and the final assembly by bolt-fastening. It is also possible to absorb by the gap c the difference in thermal expansion due to the difference in thermal expansion coefficient.

Figure 64:
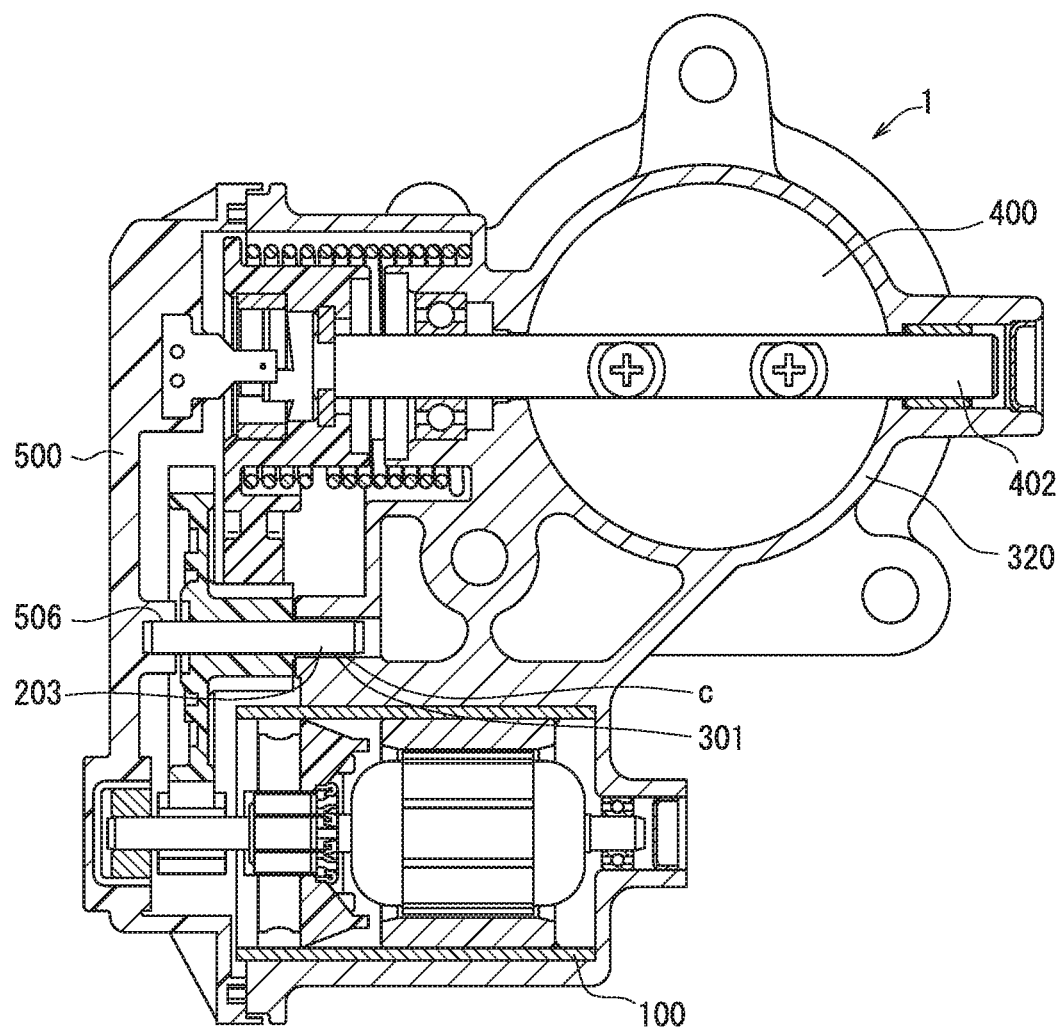
FIG. 64 is a cross-sectional view showing fixing of the intermediate shaft according to a modified example.

The minute gap c may be formed between the fitting hole 301 of the body 300 and the intermediate shaft 203. Although FIG. 64 illustrates with emphasis to show this gap c, the gap c is about several tens of microns or less in size. In the example of FIG. 64, the intermediate shaft 203 is loosely fitted into the fitting hole 301, and conversely, is tightly press-fitted into the guiding hole 506 of the cover 500. The intermediate shaft 203 may be insert-molded on the cover 500.

Figure 65:
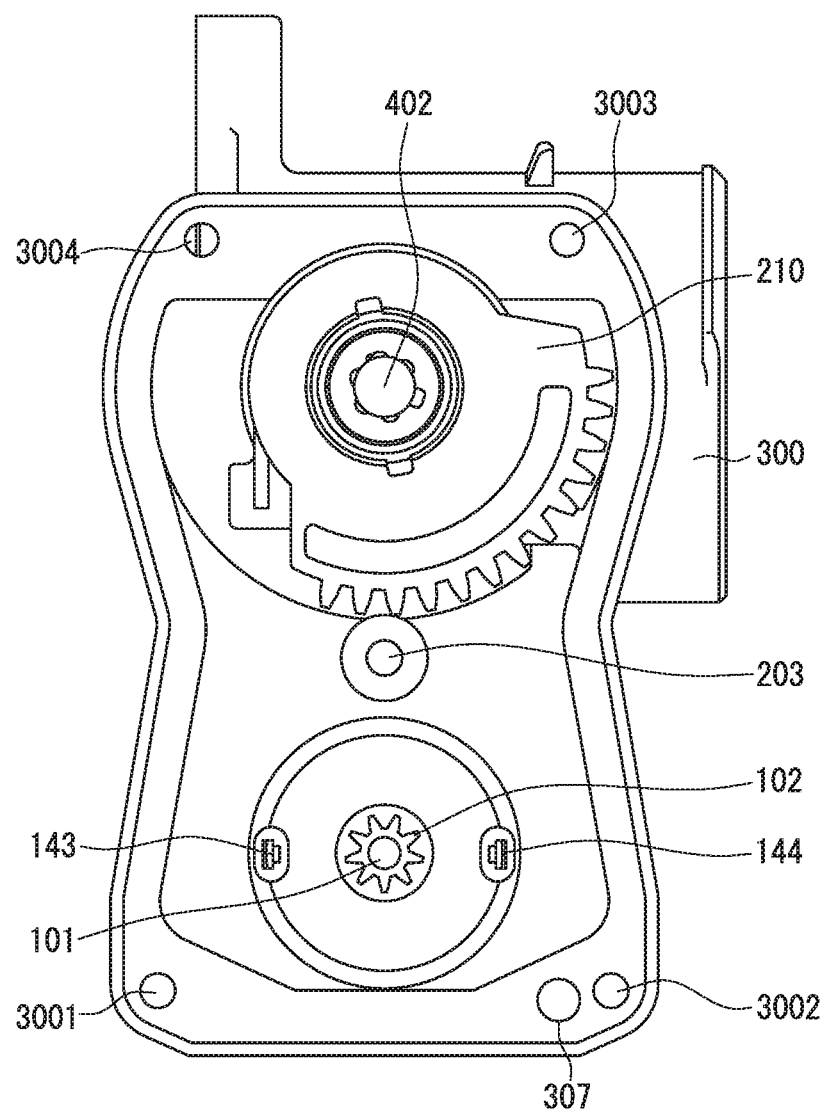
FIG. 65 is a front view of the body.
Figure 66:
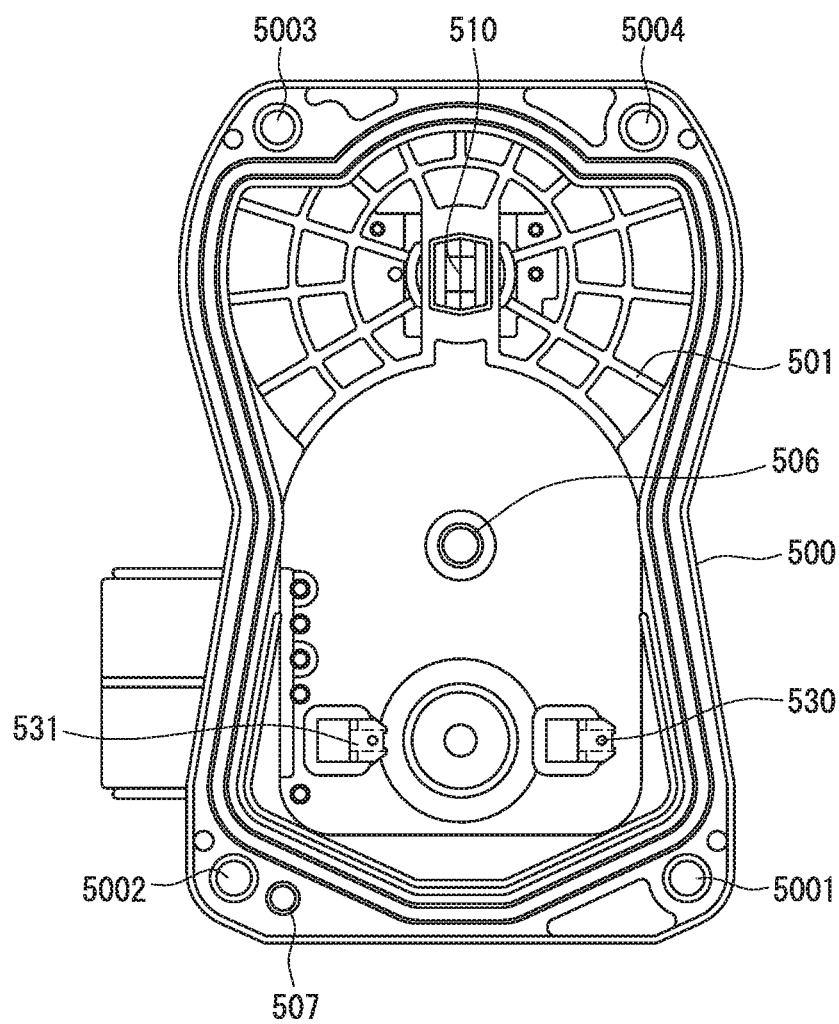
FIG. 66 is a front view of the cover.

However, the temporary assembly of the body 300 and the cover 500 may be performed as long as the intermediate shaft 203 and the reference pin 507 formed in the motor 100 are used. Thus, as shown in FIGS. 65, 66, the clearance between the shaft 203 and the guiding hole 506 of the cover 500 may be set to be smaller than the clearance between the positioning reference hole 307 of the body 300 and the positioning reference pin 507 of the cover 500. Since the center of positioning in this case substantially matches the center of the body 300 and the cover 500, both the positioning accuracy around the motor 100 (the lower side in FIG. 65) and the positional accuracy around the valve gear 210 (the upper side in FIG. 65) can be improved.

Figure 67:
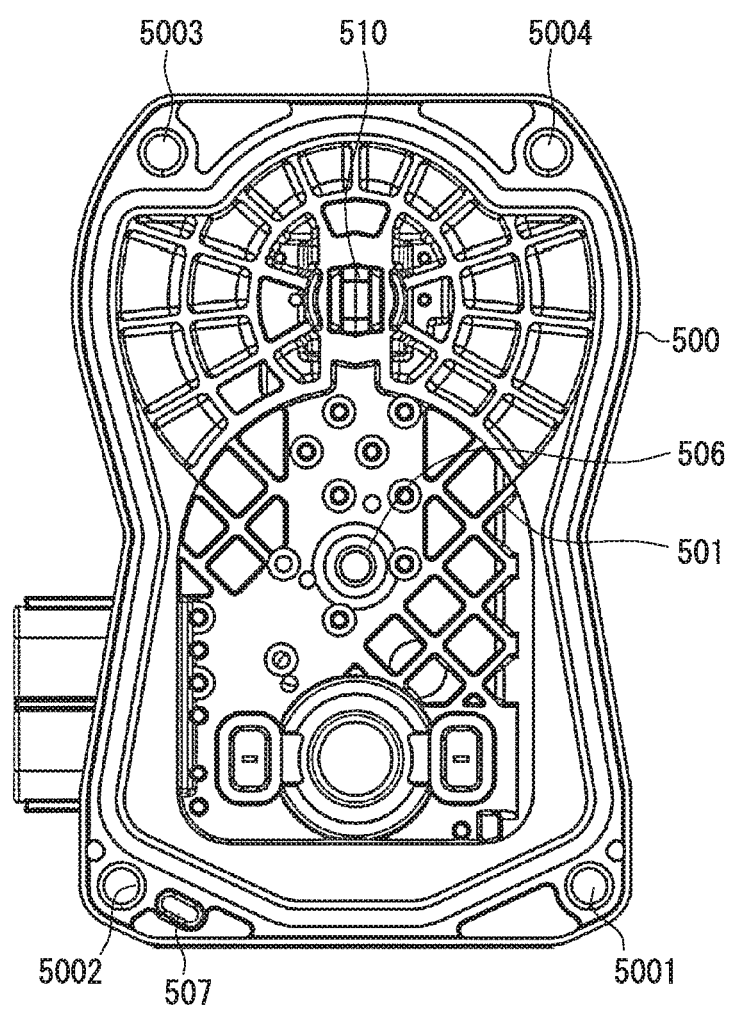
FIG. 67 is a front view of the cover according to a modified example.
Figure 68:
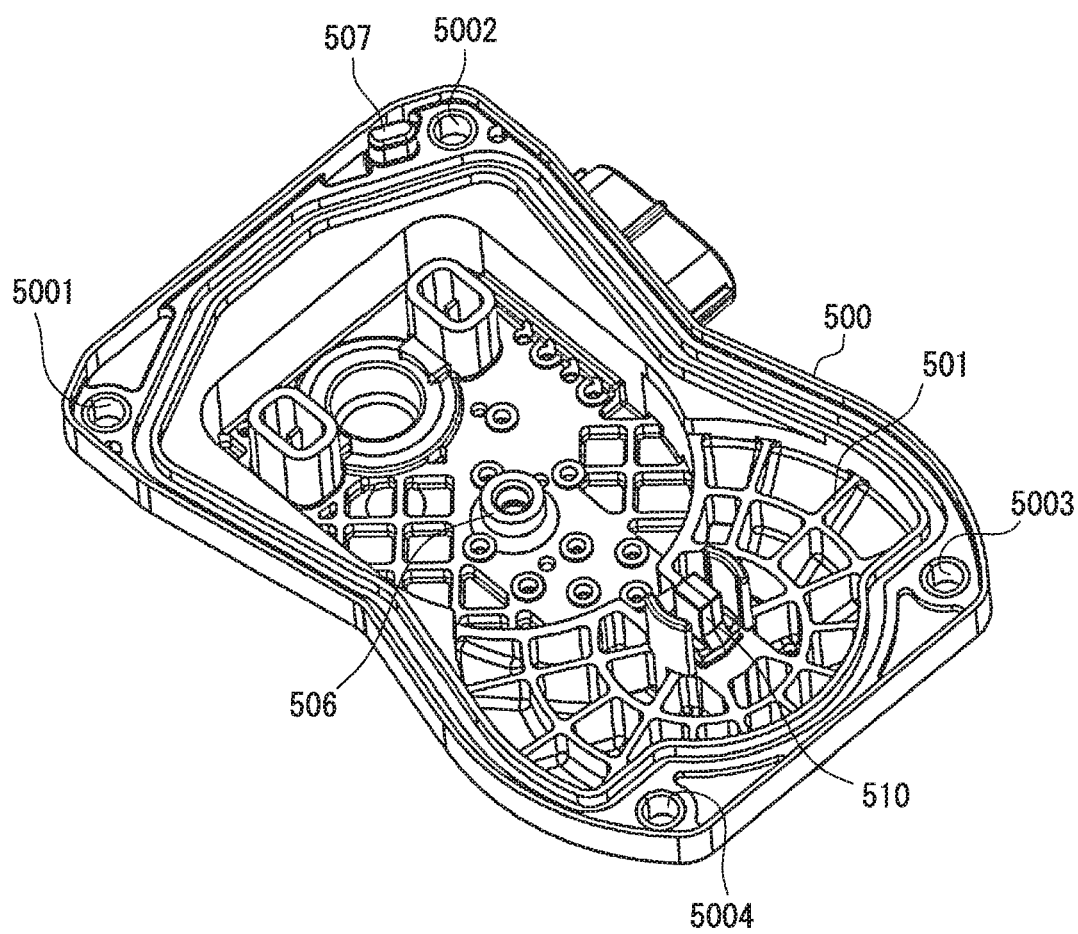
FIG. 68 is a perspective view of the cover in FIG. 67.
Figure 69:
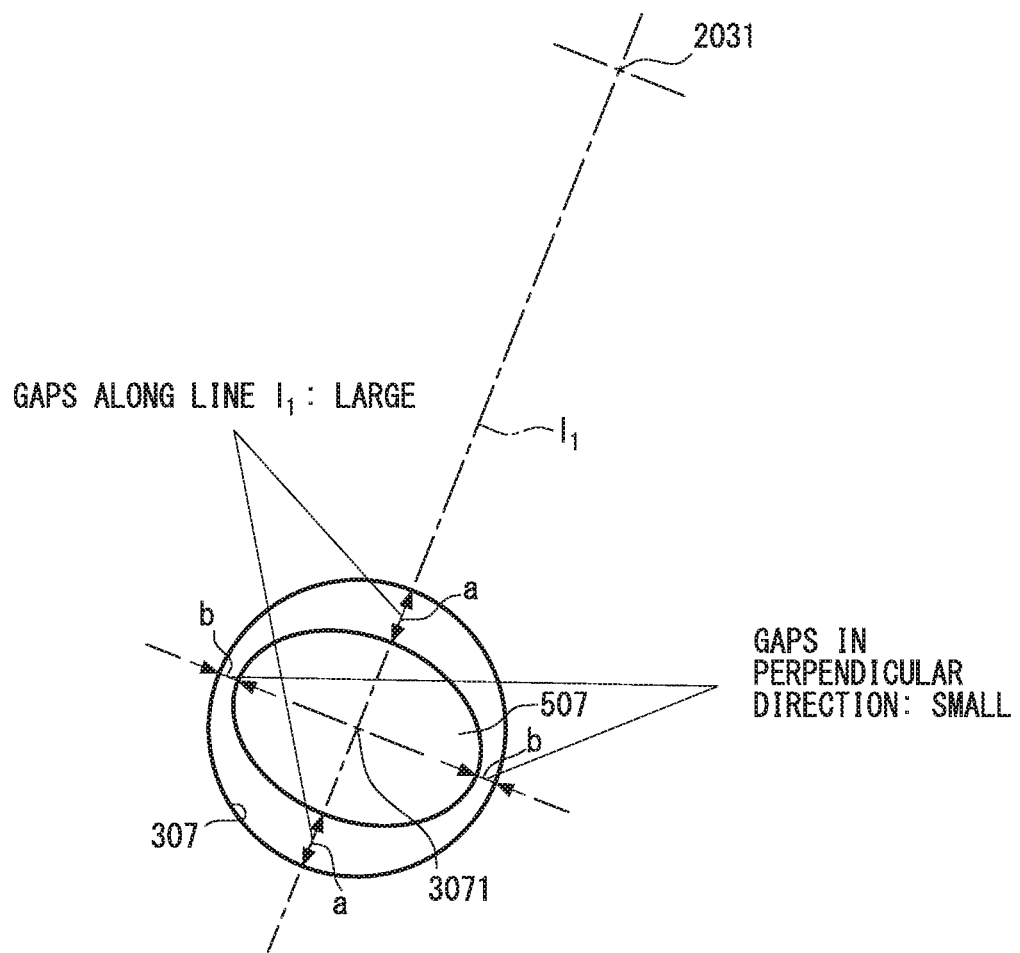
FIG. 69 is a diagram showing directions of a reference pin of the cover in FIG. 67.

As emphasized in FIGS. 67 and 68, the reference pin 507 formed in the motor 100 may have an elliptical shape, and the reference hole 307 corresponding to the reference pin 507 may be formed as a circle having a diameter larger than the major axis of the reference pin 507. In this case, as shown in FIG. 69, the major axis direction of the elliptical reference pin 507 is desirably perpendicular to a line I1 connecting the center point 2031 of the intermediate shaft 203 and the center point 3071 of the positioning reference hole 307 of the body. In other words, the positioning reference pin 507 has a first length in a direction along the line I1 and a second length in a direction perpendicular to the line I1. Then, the first length is shorter than the second length. This makes it possible to reduce the size of a minute gap (a gap "b", or a second gap, shown in FIG. 69) in the tangential direction (or the perpendicular direction) perpendicular to the line I1 (a gap "a", or a first gap, as shown in FIG. 69). As a result, the difference in thermal expansion due to the difference in coefficient of thermal expansion between the body 300 and the cover 500 can be absorbed by the large gap a, and the rotation of the cover 500 during bolt-fastening after the temporary assembly is appropriately restricted by the small gap b in the tangential direction (or the perpendicular direction).

In the example of FIG. 69, since the reference pin 507 is resin-molded integrally with the cover 500, it is easy to form the reference pin 507 in an elliptical shape, and since the reference hole 306 is formed by excavating the body 300, a circular inner diameter can be accurately formed.

In the example of FIG. 69, the shape of the reference pin 507 is an elliptical shape, but the shape may have any shape as long as the diameter in the direction along the line I1 is shorter than the diameter in the perpendicular direction.

Furthermore, contrary to the above example, the reference pin may be formed in the body 300, and the reference hole may be formed in the cover 500. In this case, a fitting hole is formed in the body 300, and the reference pin is fitted into the fitting hole. As described above, this modification in which the reference pin is formed in the body 300 and the reference hole is formed in the cover 500 is not necessarily limited to the example of FIG. 69, and can be applied to the examples of FIGS. 2 and 3.

When it is premised that the assembly of the cover 500 is slightly rotated about the intermediate shaft 203 located at the center, the shapes of the terminals 143 and 144 in the motor 100 and the terminals 530, 531 in the cover 500 can also be set to match the shape of the cover 500.

Figure 71:
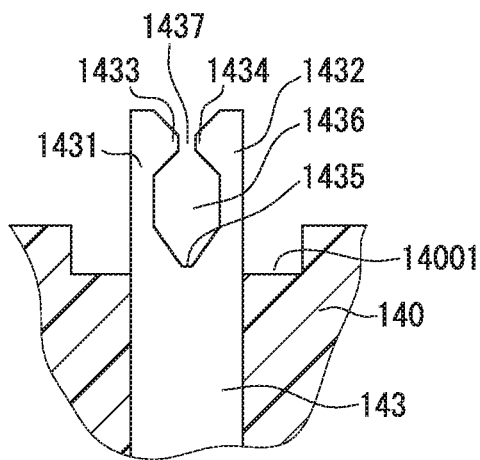
FIG. 71 is a cross-sectional view showing a terminal.

Although FIG. 71 shows the terminal 143 in the motor 100, its shape is the same of the terminal 144 in the motor 100 and the terminals 530, 531 in the cover 500. That is, the terminals 143, 144 in the motor 100 or the terminals 530, 531 in the cover 500 have a tuning fork shape as shown in FIG. 71, and the remainders of the terminals 143, 144 or the terminals 530, 531 have a plate shape that can be fitted into the tuning fork shape of the terminals.

In the following description, it is assumed that the terminals 143 and 144 in the motor 100 have a tuning fork shape, and the terminals 530 and 531 in the cover have a plate shape, and description for the terminal shape will be described based on the terminal 143.

The terminal 143 has a tuning fork shape, and a pair of engaging portions 1431 and 1432 are formed at a tip end thereof. Engaging bodies 1433 and 1434 protrude from the engaging portions 1431 and 1432 at their tip ends, and a holding space 1436 is formed between the engaging bodies 1433 and 1434 and a root portion 1435.

The gap 1437 between the engaging bodies 1433 and 1434 is smaller than the thickness of the terminal 530 by several tens of microns to 0.1 mm. Therefore, when the terminal in the motor 100 and the terminal in the cover 500 are engaged with each other, the engaging portions 1431 and 1432 of the tuning fork-shaped terminal are pushed open and the plate-shaped terminal is held in the holding space 1437. The engagement between the terminal in the motor 100 and the terminal in the cover 500 is maintained by the spring force caused by the elastic deformation of the engaging portions 1431 and 1432 of the tuning fork-shaped terminal.

A recess 14001 is formed in the brush holder 140 to prevent the root portion 1435 of the terminal 143 from being buried in the brush holder 140. Therefore, even if the engaging portions 1431 and 1432 are pushed open at the time of engagement, stress due to deformation of the terminal 143 is not directly applied to the brush holder 140, and therefore durability of the brush holder 140 is improved.

Figure 70:
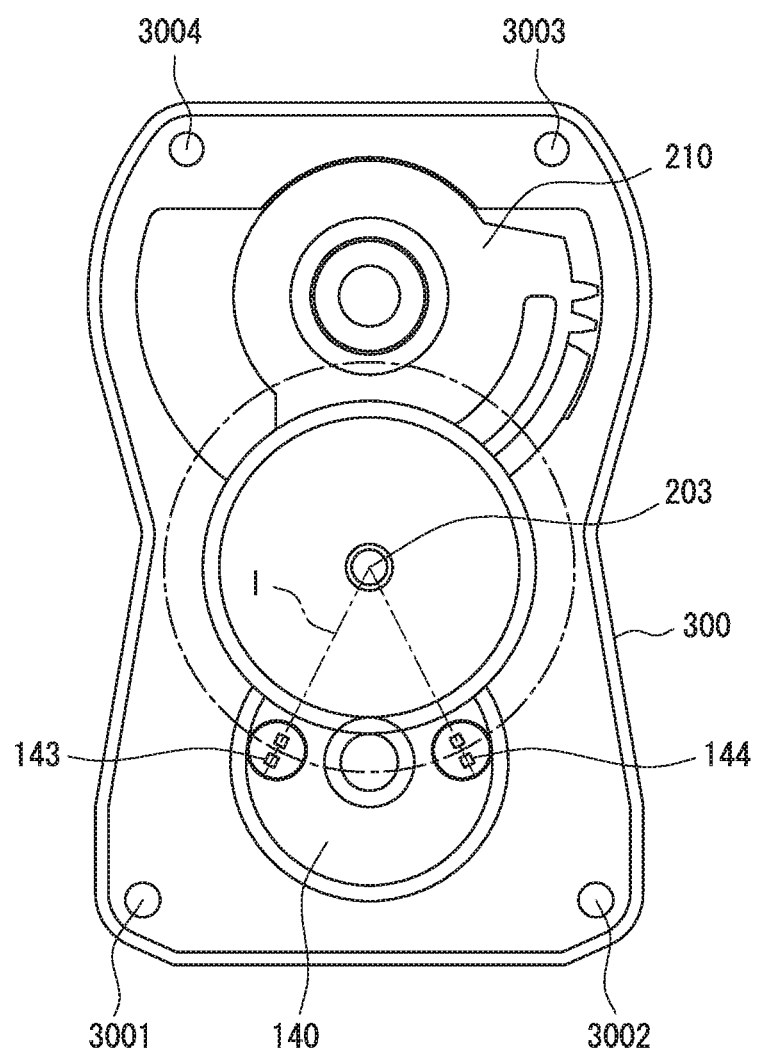
FIG. 70 is a front view of the body.

In this example, the terminal in the motor 100 and the terminal in the cover 500 are arranged so that the terminals have thickness directions that are perpendicular to each other. As shown in FIG. 70, the terminals 143 and 144 in the motor 100 are arranged such that the thickness directions thereof are parallel to the line I connecting the intermediate shaft 203 and each of the terminals 143 and 144. Therefore, the terminals 530 and 531 in the cover 500 are arranged such that the thickness directions thereof are perpendicular to the line connecting the guiding hole 506 and the terminals 530 and 531.

With such an arrangement, even if a slight amount of misalignment occurs between the body 300 and the cover 500 during bolt-fastening, it is possible to efficiently prevent the pair of engaging portions 1431 and 1432 from being pushed open by the misalignment.

Figure 72:
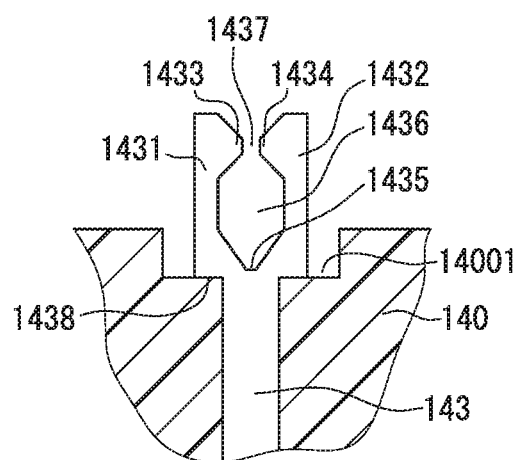
FIG. 72 is a cross-sectional view showing a terminal according to a modified example.
Figure 73:
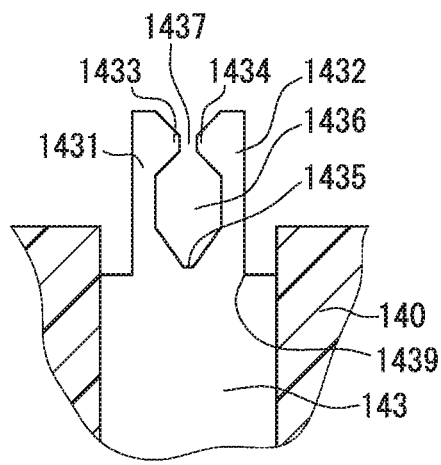
FIG. 73 is a cross-sectional view showing a terminal according to a modified example.

The shape of the terminal can be changed in various ways. As shown in FIG. 72, a stepped portion 1438 may be formed in the terminal 143 to increase the width of the engaging portions 1431 and 1432. By the step portion 1438, the positioning of the terminal 143 with respect to the recess 14001 of the brush holder 140 becomes accurate. Further, as shown in FIG. 73, a step portion 1439 may be formed to reduce the width of the engaging portions 1431 and 1432. In this case, the step portion 1439 forms a space around the root portion 1435 so that it is not necessary to form the recess 14001 in the brush holder 140 as shown in FIG. 71.

Figure 74:
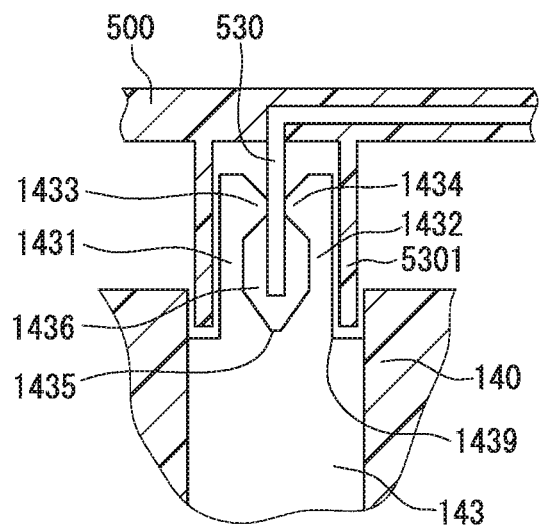
FIG. 74 is a cross-sectional view showing a terminal according to a modified example.

The shapes of the cover 500 and the brush holder 140 can also be variously changed. As shown in FIG. 74, a cylindrical protector 5301 that covers the periphery of the plate-shaped terminal 530 may be formed. By inserting a tip of the protector 5301 into the brush holder 140 up to near the step portion 1439 of the terminal 143, the terminals 143 and 530 can be covered, and foreign matter caused by abrasion powders of the coil spring 450 can be prevented from reaching the terminals 143 and 530.

In the above example, the body 300 and the cover 500 are fixed by the bolts 4000 (see FIGS. 75 and 77), but other fixing members such as rivets and clips may be used instead of the bolts 4000.

Figure 75:
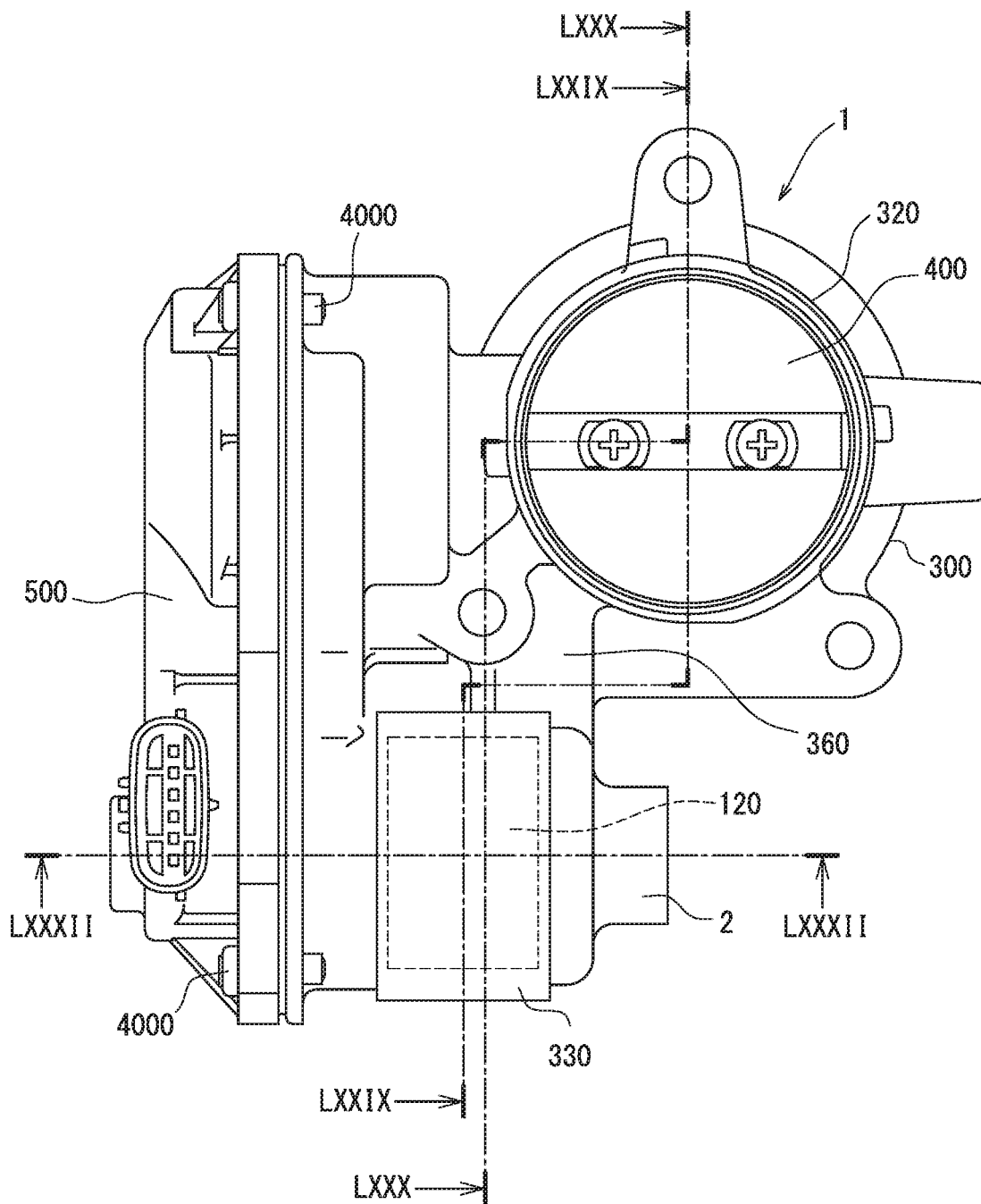
FIG. 75 is a front view of an electronic throttle device.
Figure 76:
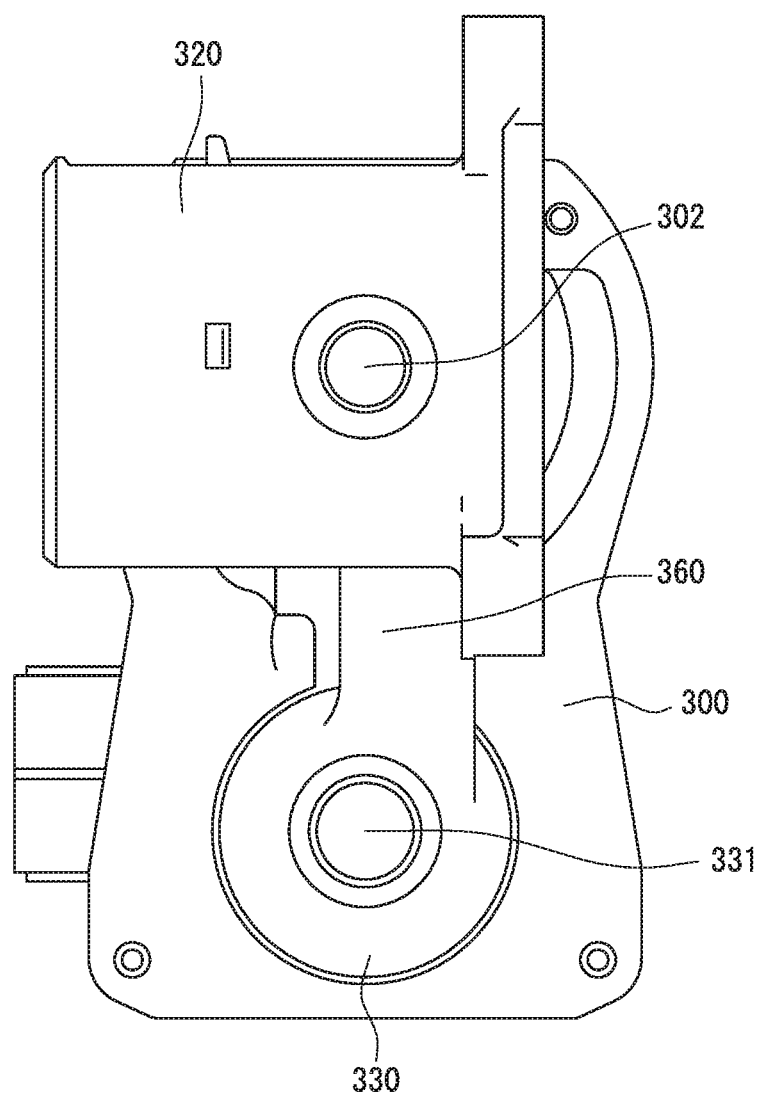
FIG. 76 is a side view of the electronic throttle device.
Figure 77:
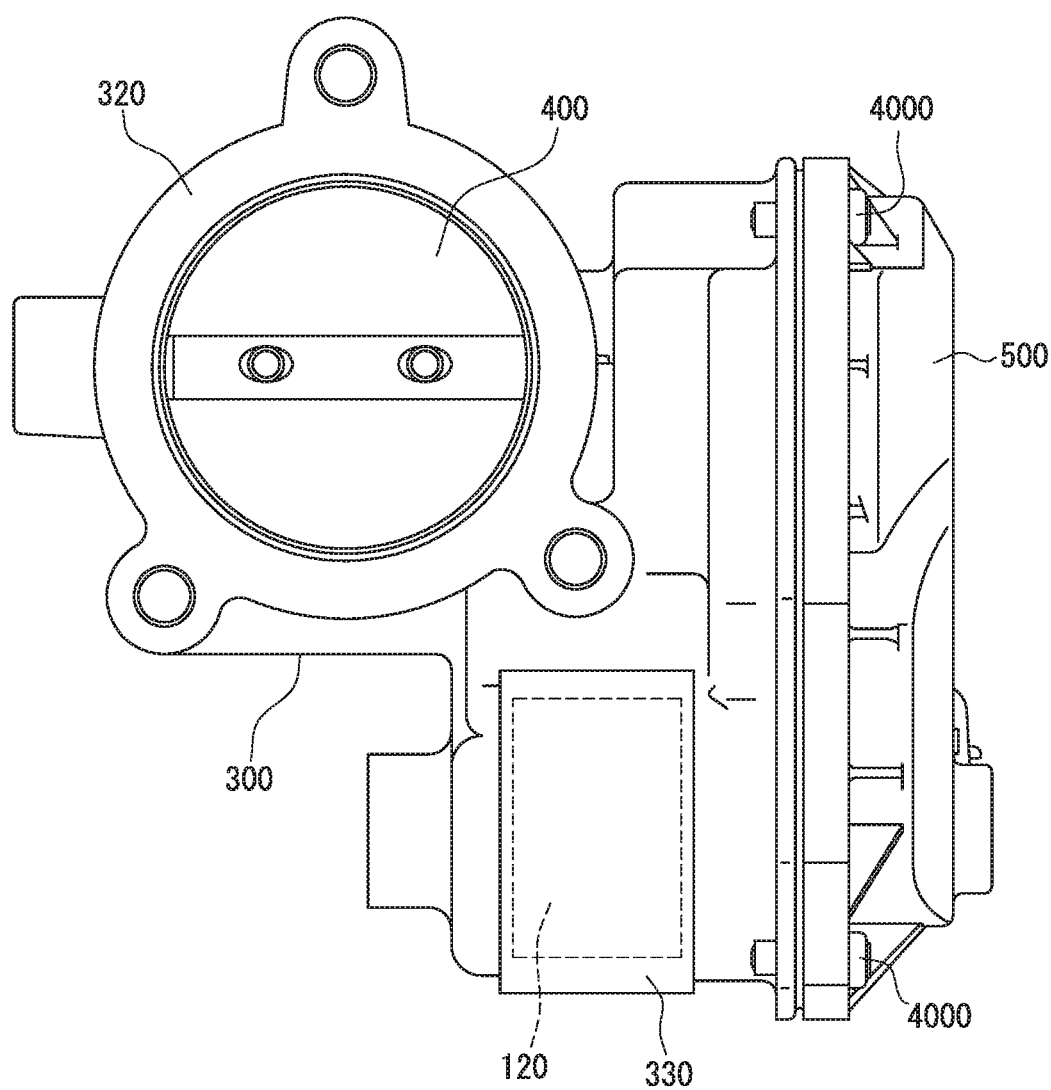
FIG. 77 is a rear view of the electronic throttle device.

FIGS. 75 to 77 show a state in which the electronic throttle device 1 is assembled by the above-described assembly process. The body 300 has the open end 303 with a rectangular shape similar to the cover 500, and the open end 303 is bolted to the cover 500. Both the space 330 and the intake passage 320 in which the throttle valve 400 is disposed have a cylindrical shape. The cylindrical shape that serves as the motor space 330 and the cylindrical shape that serves as the intake passage 320 are separate from each other, and the both spaces 330 and 320 are partially connected by a connecting portion 360.

As shown in FIGS. 11, 17 and 18, the two magnets 120 are arranged in the motor yoke 110, and a specified space is defined between one magnet 120 and the other magnet 120. In this example, the magnets 120 are arranged on the left and right sides of the motor space 310 as shown in FIG. 11. Therefore, the space between the two magnets 120 corresponds to the connecting portion 360 of the body 300. In other words, as shown in FIGS. 75 and 77, the magnets 120 arranged in the motor space 330 of the body 300 are not blocked by the connecting portion 360. That is, the connecting portion 360 is aligned with the space between the two magnets 120 in a radial direction of the yoke 110 (see FIG. 79).

Figure 78:
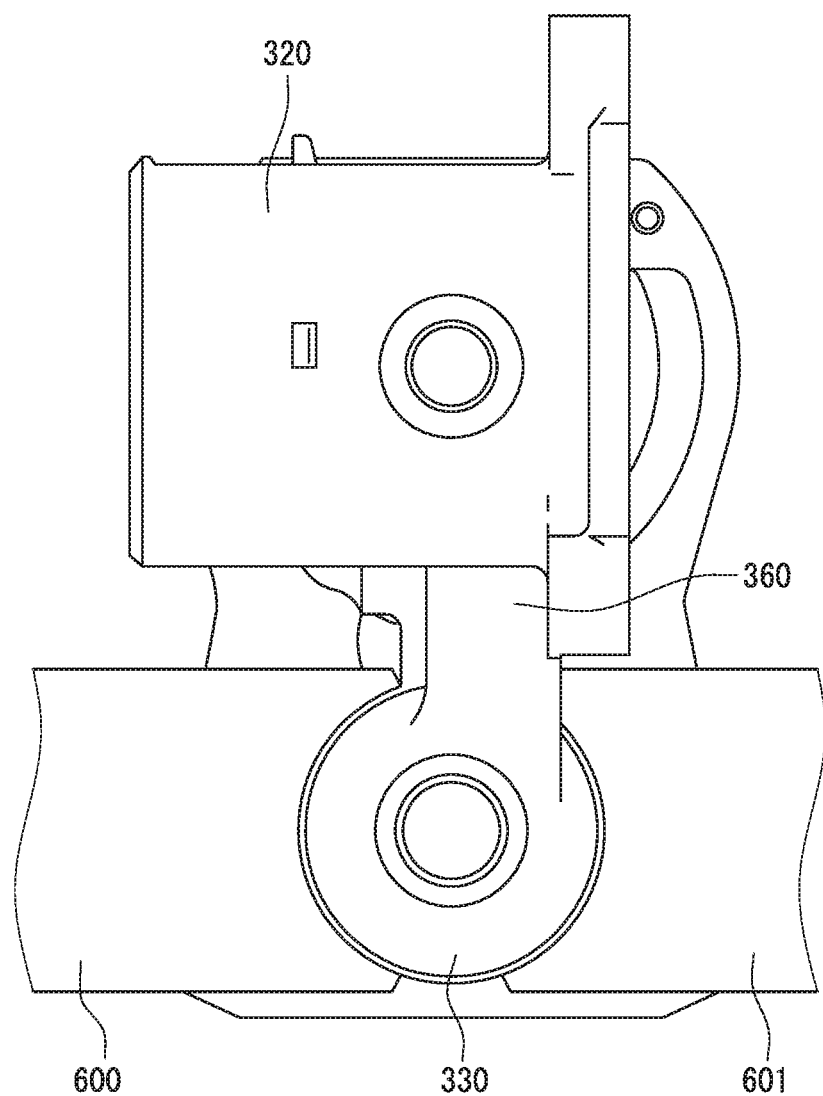
FIG. 78 is a diagram in which a magnetizing yoke is arranged in the electronic throttle device in FIG. 76.

At the time of assembling of the electronic throttle device 1, the magnets 120 are not magnetized in order to facilitate the assembling process, and are magnetized by a pair of magnetizing yokes 600 and 601 after the assembling. The pair of magnetizing yokes 600 and 601 are disposed corresponding to the pair of magnets 120, respectively, as shown in FIG. 78. More specifically, as shown in FIG. 79 showing a cross-sectional view taken along LXXIX-LXXIX line in FIG. 75 and in FIG. 80 showing a cross-section view taken along LXXX-LXXX line in FIG. 75, end surfaces 602, 603 of the magnetizing yokes 600, 601 have an arc shape in accordance with the shape of the motor space 330 of the body 300, and can face the magnets 120 without interference by the connecting portion 360 of the body 300.

Figure 79:
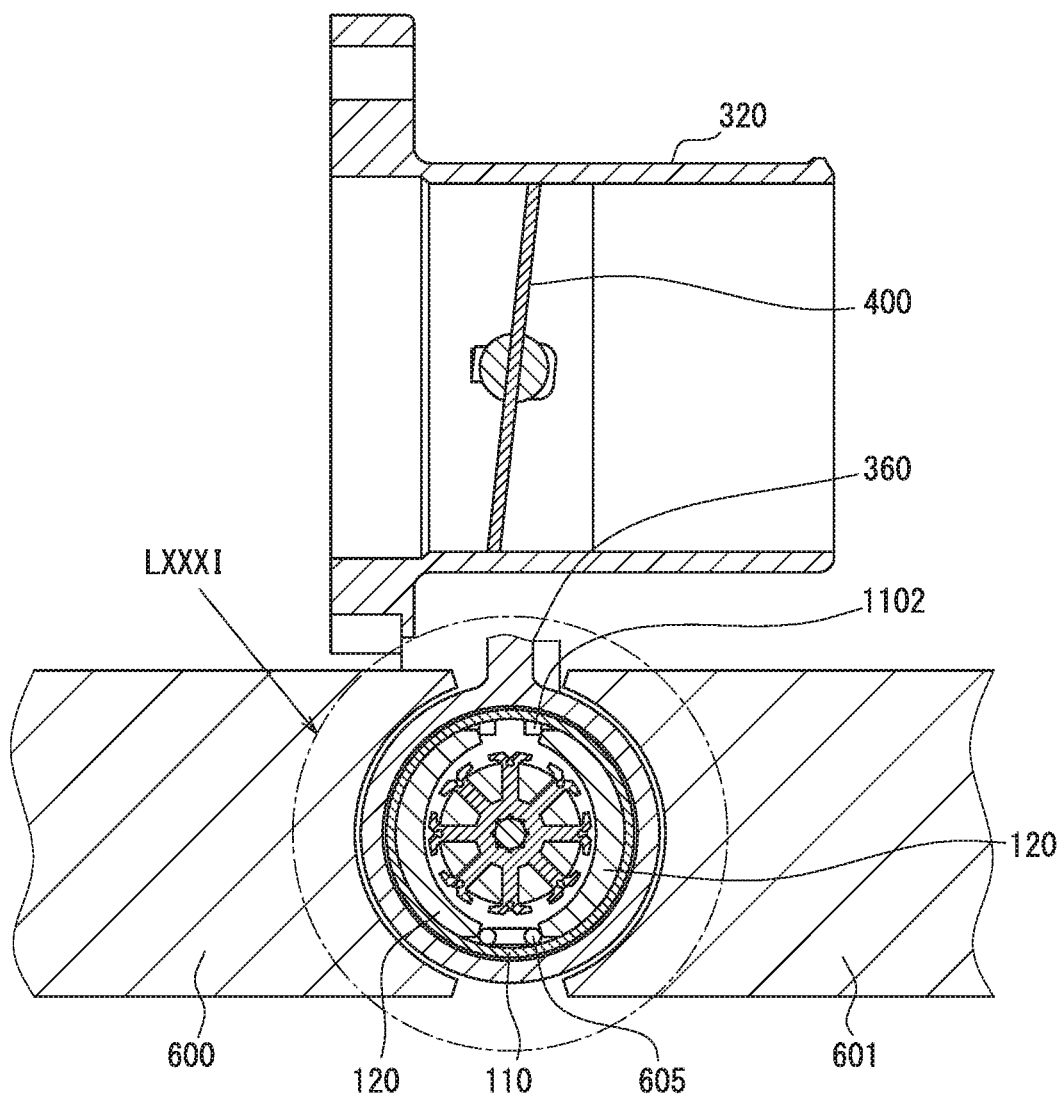
FIG. 79 is a cross-sectional view taken along line LXXIX-LXXIX in FIG. 75.
Figure 80:
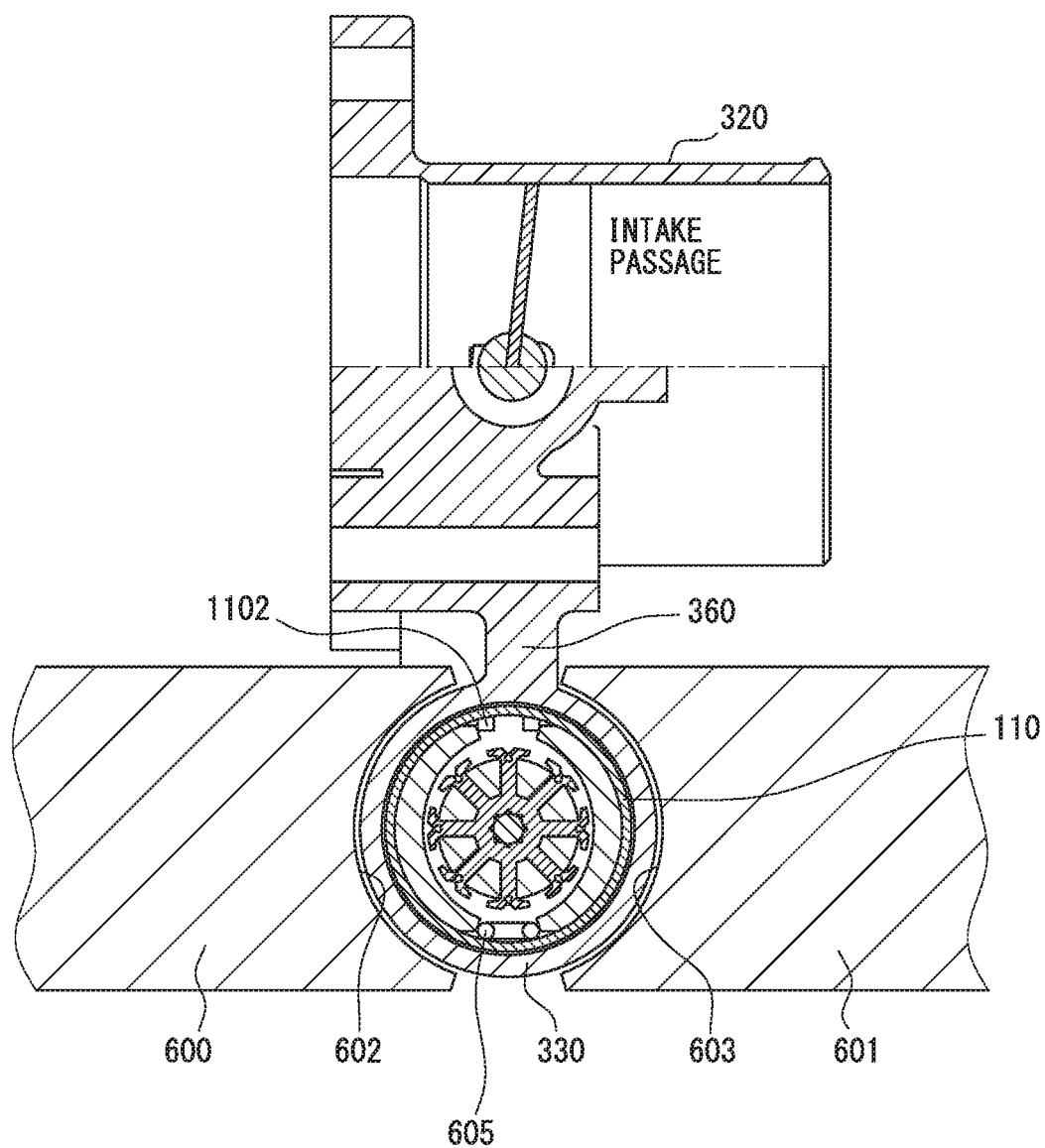
FIG. 80 is a cross-sectional view taken along line LXXX-LXXX in FIG. 75.

As shown in FIGS. 79 and 80, one end of each of the arc-shaped magnets 120 is in contact with a holding portion 1102 of the motor yoke 110, and a holding spring 605 is arranged at the other end of each of the magnets 120. The magnets 120 are biased by the holding spring 605 against the holding portion 1102 to be held at a desired position.

Although not shown, coils are wound around the magnetizing yokes 600, 601. By applying a large current to the coil, the yokes 600, 601 get electro-magnetized, and the magnets 120 are magnetized by the magnetic force at that time of supplying the current.

Figure 81:
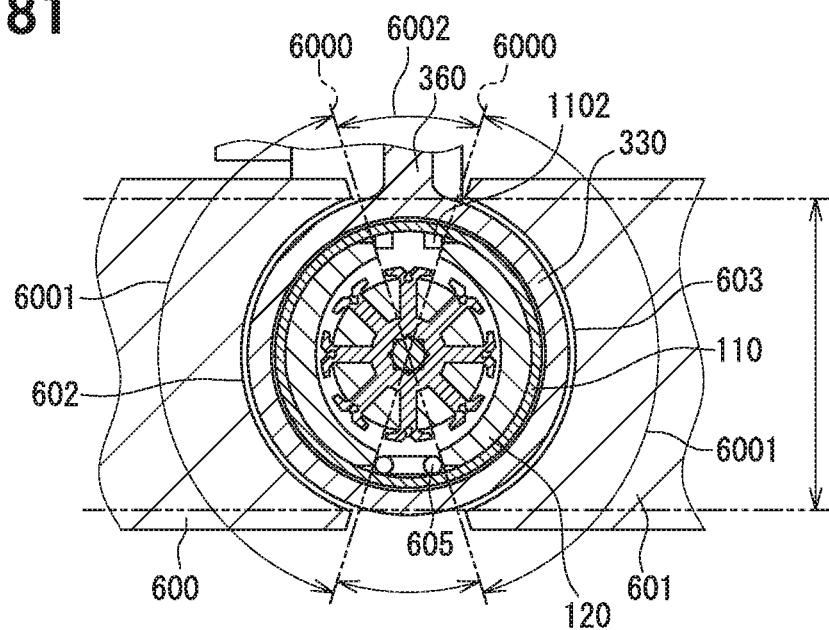
FIG. 81 is an enlarged view of LXXXI portion in FIG. 79.

As shown in FIG. 81 showing an enlarged view of LXXXI portion in FIG. 79, each of the magnets 120 is arranged within an area 6001 defined by two line 6000 connecting both ends of the magnetizing yokes 600 and 601. In addition, the thickness of the motor space 330 of the body 300 has a constant value at the portion facing the magnetizing yokes 600 and 601. Therefore, the magnets 120 can be magnetized uniformly. As described above, the connecting portion 360 of the body 300 is positioned within a region 6002 which is spaced away from the magnetizing yokes 600 and 601.

Figure 82:
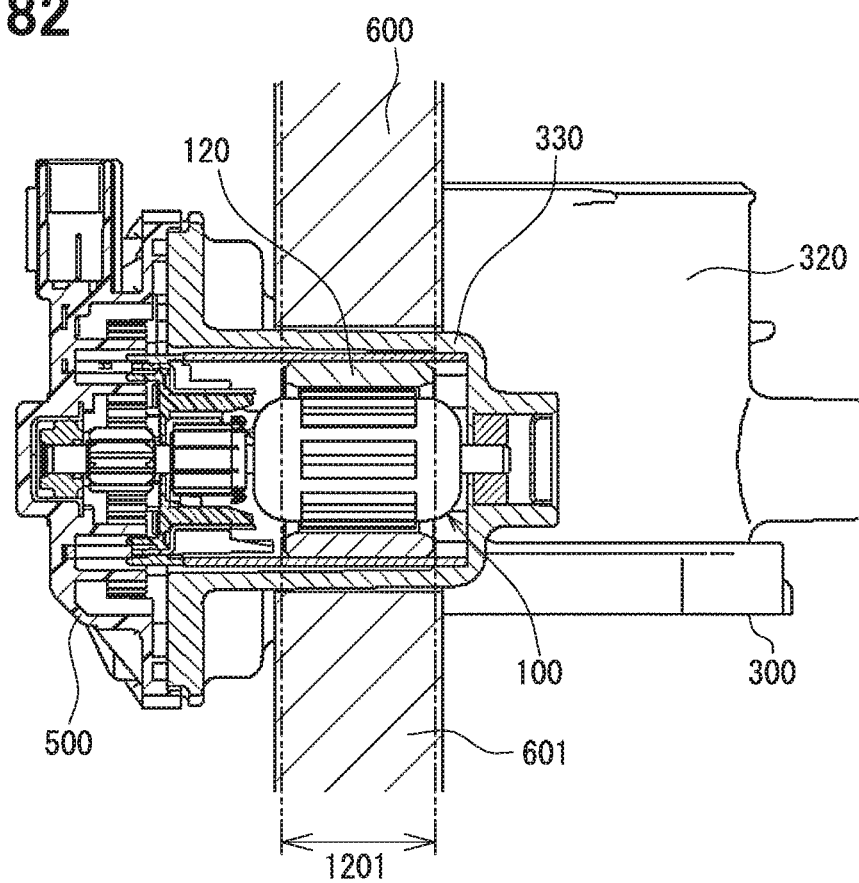
FIG. 82 is a cross-sectional view taken along the line LXXXII-LXXXII of FIG. 75.

Further, as shown in FIG. 82 showing a cross-sectional view taken along the line LXXXII-LXXXII of FIG. 75, the constant thickness of the motor space 330 of the body 300 is maintained even in the axial direction facing the magnetizing yokes 600 and 601. In addition, the widths of the magnetizing yokes 600 and 601 are longer than an axial width 1201 of each of the magnets 120. This also makes it possible to achieve equal (or uniform) magnetization of the magnet 120.

Figure 83:
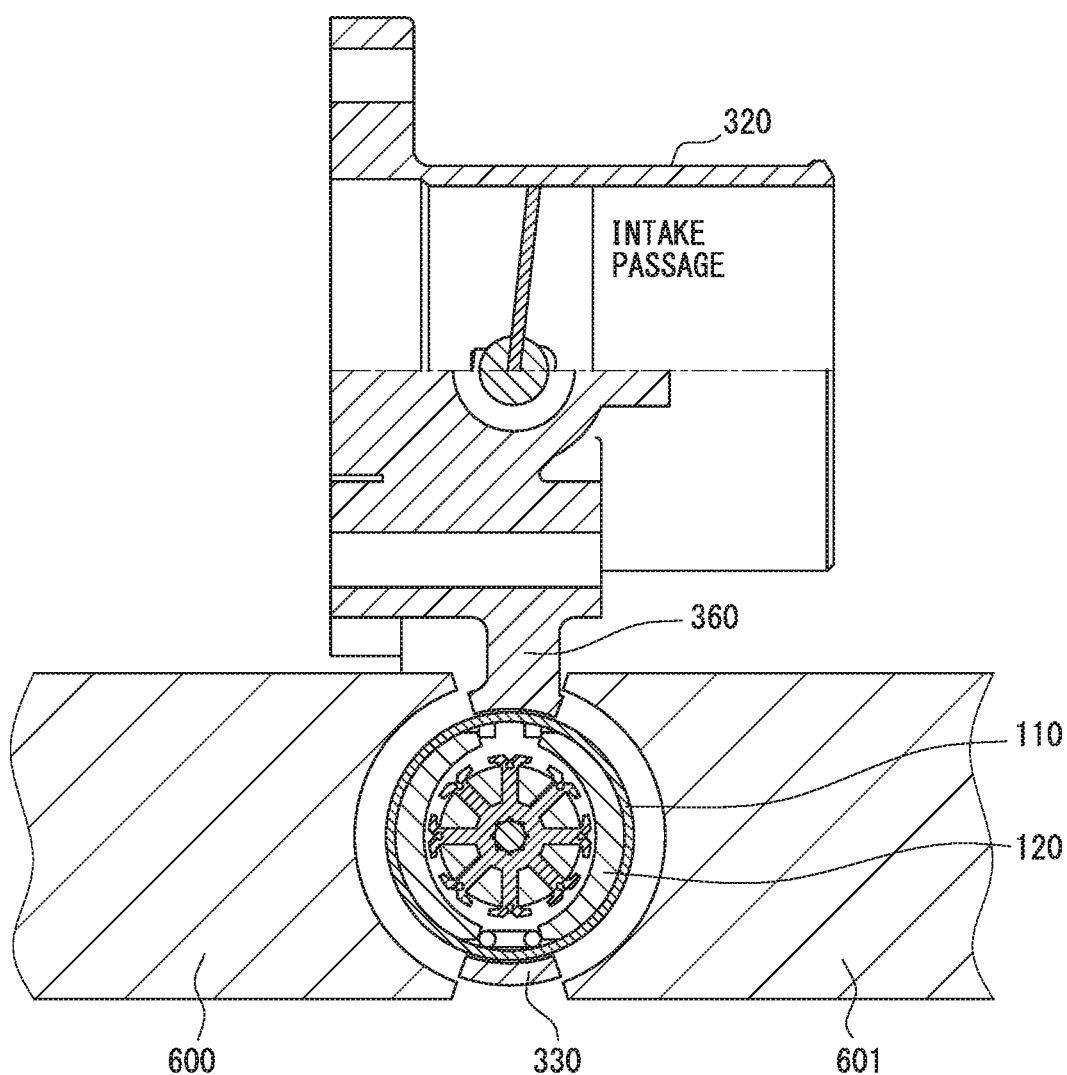
FIG. 83 is a cross-sectional view showing a body according to a modified example.

As described above, the magnets 120 can be sufficiently magnetized even after they are housed in the body 300 made of aluminum. However, if necessary, a portion of the body 30 corresponding to the inner magnets 120 may be cut out. FIG. 83 shows an example in which two windows are formed in the body 30 so that the magnetizing yokes 600 and 601 can directly face the motor yoke 110. Since the motor yoke 110 is exposed to the yokes 600, 601, the magnetizing efficiency by the magnetizing yokes 600 and 601 can be improved.

What is claimed is:

1. A throttle valve device, comprising:
  a body that defines a passage on one side and a motor space on the other side therein;
  a valve that is disposed in the passage and is configured to rotate together with a shaft to control a flow rate by adjusting a passage area of the passage;
  a valve gear that rotates the shaft;
  a motor that is disposed in the motor space and generates a driving force for the valve gear to rotate;
  an intermediate gear that is disposed between the motor and the valve gear, the intermediate gear configured to transmit the driving force of the motor to the valve;
  an intermediate shaft that rotatably supports the intermediate gear; and
  a cover that covers an open end of the body to house the valve gear, the intermediate gear, and the motor in the body, wherein
  a guiding hole is formed in the cover and the intermediate shaft engages the guiding hole,
  a positioning reference pin is formed in one of the cover and the body at a position around the motor,
  a positioning reference hole is formed in the other of the cover and the body at a position around the motor,
  the body and the cover are positioned with respect to each other by both engaging between the intermediate shaft and the guiding hole and engaging between the positioning reference pin and the positioning reference hole,
  the body and the cover are fixed to each other by a fixing member, and
  a first gap between the positioning reference pin and the positioning reference hole in a direction along a line that connects the positioning reference pin and the intermediate shaft is larger than a second gap between the positioning reference pin and the positioning reference hole in a direction perpendicular to the line that connects the positioning reference pin and the intermediate shaft.

2. The throttle valve device according to claim 1, wherein a clearance between the intermediate shaft and the guiding hole is smaller than a clearance between the positioning reference pin and the positioning reference hole.

3. The throttle valve device according to claim 2, wherein the positioning reference pin has a first length in the direction along the line that connects the positioning reference pin and the intermediate shaft,
  the positioning reference pin has a second length in the direction perpendicular to the line that connects the positioning reference pin and the intermediate shaft,
  the first length is shorter than the second length, and
  the positioning reference hole has a circular shape.

4. The throttle valve device according to claim 1, wherein a clearance between the intermediate shaft and the guiding hole is larger than a clearance between the positioning reference pin and the positioning reference hole.

5. The throttle valve device according to claim 4, wherein the intermediate shaft is press-fitted into the body, and a third gap is formed between the intermediate shaft and the guiding hole.

6. The throttle valve device according to claim 4, wherein
the intermediate shaft is supported by the guiding hole, and
the intermediate shaft is loosely inserted into the body.

7. The throttle valve device according to claim 1, wherein
the positioning reference pin is elliptical in shape, and
the positioning reference hole is circular in shape.

* * * * *